(12) United States Patent
Hori et al.

(10) Patent No.: US 8,830,961 B2
(45) Date of Patent: Sep. 9, 2014

(54) MOBILE WIRELESS SYSTEM, ACCESS POINT DEVICE, AND HANDOVER PROCESSING METHOD

(75) Inventors: Takako Hori, Kanagawa (JP); Takeshi Kanazawa, Kanagawa (JP); Akito Fukui, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 116 days.

(21) Appl. No.: 13/636,872

(22) PCT Filed: Mar. 18, 2011

(86) PCT No.: PCT/JP2011/001656
§ 371 (c)(1),
(2), (4) Date: Sep. 24, 2012

(87) PCT Pub. No.: WO2011/118196
PCT Pub. Date: Sep. 29, 2011

(65) Prior Publication Data
US 2013/0039343 A1  Feb. 14, 2013

(30) Foreign Application Priority Data

Mar. 26, 2010  (JP) ................. 2010-072359
Jan. 7, 2011  (JP) ................. 2011-002189

(51) Int. Cl.
*H04W 36/08* (2009.01)
*H04W 36/12* (2009.01)
*H04W 76/04* (2009.01)

(52) U.S. Cl.
CPC ............ *H04W 36/12* (2013.01); *H04W 76/041* (2013.01)
USPC ........... 370/331; 370/335; 370/338; 370/401; 455/13.1; 455/13.2; 455/428; 455/430; 455/436

(58) Field of Classification Search
None
See application file for complete search history.

(56) References Cited

U.S. PATENT DOCUMENTS 5,920,804 A * 7/1999 Armbruster et al. ......... 455/13.2
8,189,606 B2 * 5/2012 Leroy et al. .................. 370/401
(Continued)

FOREIGN PATENT DOCUMENTS

JP  2006-74741  3/2006

OTHER PUBLICATIONS

"Intra-E-UTRAN handover", 3GPP, Dec. 2009, pp. 125-150.
(Continued)

*Primary Examiner* — Chi Pham
*Assistant Examiner* — Shick Hom
(74) *Attorney, Agent, or Firm* — Greenblum & Bernstein, P.L.C.

(57) ABSTRACT

A mobile wireless system includes a first gateway (L-PGW), a second gateway (PGW), a first access point (HeNB) capable of establishing a communication path simultaneously with the first and second gateways, and a second access point (eNB) capable of establishing a communication path only with the PGW. When a mobile terminal connected to the HeNB and communicating with a communication destination node using a first path through the L-PGW switches a connection destination to the eNB, the HeNB establishes a second path through the HeNB and the PGW, while maintaining the first path. The HeNB transmits data, which has been transmitted to the HeNB along the first path, to the eNB along the second path, until the UE is connected to the eNB, and a third path to the communication destination node through the PGW is established. Accordingly, an interruption time of data reception involved in handover is shortened.

11 Claims, 34 Drawing Sheets

(56) References Cited

U.S. PATENT DOCUMENTS

| | | | |
|---|---|---|---|
| 2006/0029022 A1 | 2/2006 | Brouet et al. | |
| 2007/0008928 A1* | 1/2007 | Kezys | 370/331 |
| 2007/0047492 A1* | 3/2007 | Kim et al. | 370/331 |
| 2008/0102843 A1* | 5/2008 | Todd et al. | 455/445 |

OTHER PUBLICATIONS

R. Koodli, "Mobile IPv6 Fast Handovers", Network Working Group, Jul. 2009, pp. 1-51.

C. Perkins, "IP Mobility Suppport for IPv4", Network Working Group, Aug. 2002.

D. Johnson, "Mobility Support in IPv6", Network Working Group, Jun. 2004.

J. Rosenberg et al., "SIP: Session Initiation Protocol", Network Working Group, Jun. 2002.

"Architecture aspects of Home NodeB and Home eNodeB", 3GPP TR23.830, V9.0.0, Sep. 2009.

"General Packet Radio Service (GPRS) enhancements for Evolved Universal Terrestrial Radio Access Network", 3GPP TS23.401, V9.3.0, Dec. 2009.

NORTEL, "Proposed way forward for the LTE specific open issues for LIPA with local PDN connection", 3GPP SA2 #73, S2-093666, May 2009, pp. 1-15.

International Search Report, dated Jun. 21, 2011, for corresponding International Application No. PCT/JP2011/001656.

* cited by examiner

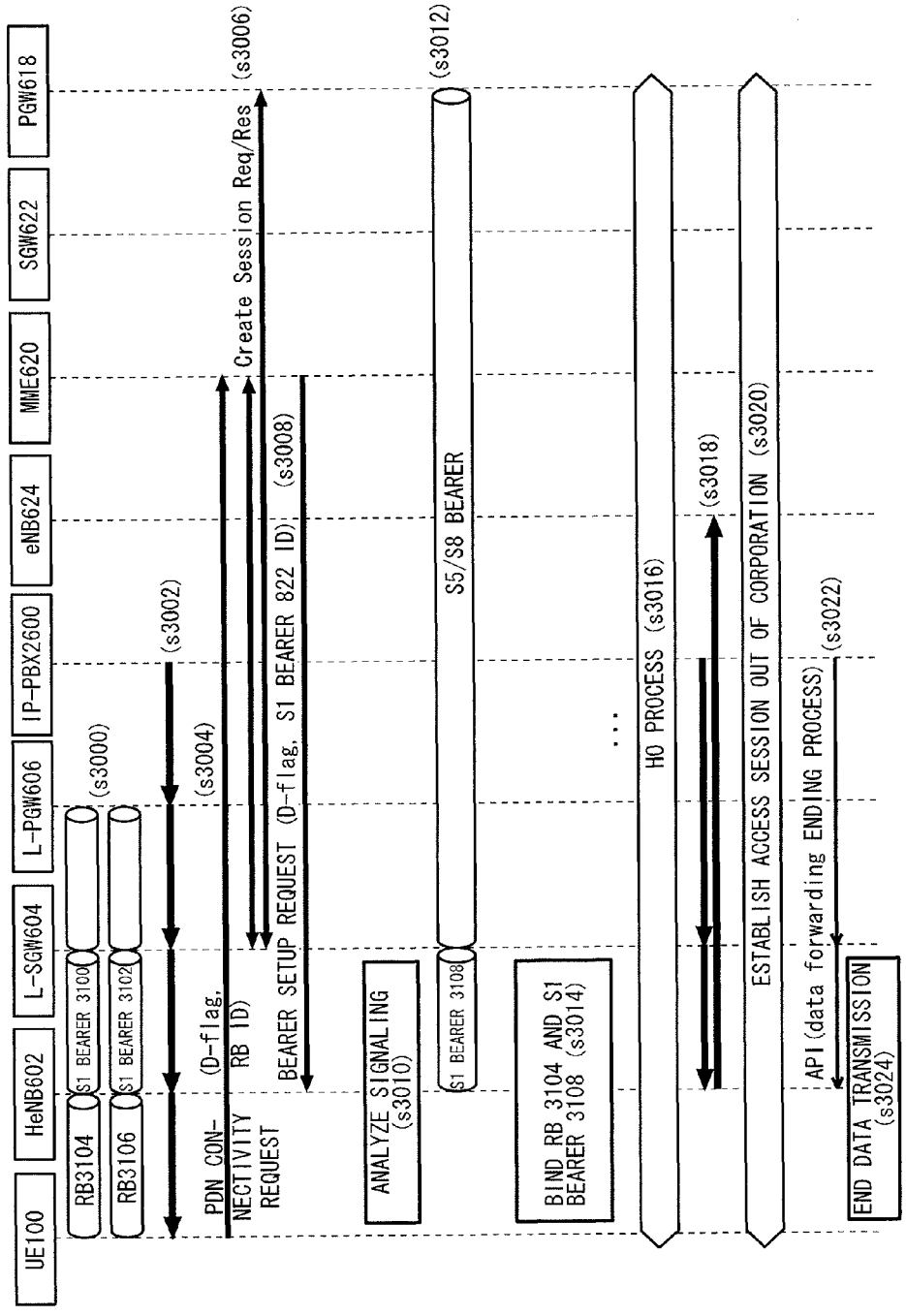

MOBILE WIRELESS SYSTEM, ACCESS POINT DEVICE, AND HANDOVER PROCESSING METHOD

TECHNICAL FIELD

The present invention relates to a mobile wireless system, an access point device, and a handover processing method in which a mobile terminal performs handover between networks in which handover anchor points are different from each other.

BACKGROUND ART

NPL 1 relates to the specifications of the next generation packet switched (PS) network by SAE (System Architecture Evolution) of the 3GPP (3rd Generation Partnership Project). FIG. 21 is a diagram illustrating a part of a network configuration disclosed in NPL 1. A network 406 is a collection of IP-based networks, such as the Internet or an ISP (Internet Service Provider). An access network (EPC: Evolved Packet Core) 420 is an access network connected to the network 406. In the EPC 420, an access point (eNB or eNodeB) 402 and an eNB 412, which are wireless access points of a mobile terminal (UE: User Equipment) 100, and a gateway node (PGW: Packet data network GateWay) 416, which is a connection gateway of the network 406 and serves as a handover anchor point, are present.

A communication destination node 408 that can perform communication of IP packet data (hereinafter, simply referred to "data") with the UE 100 is connected to the network 406. In the EPC 420, a signaling processing node (MME: Mobility Management Entity) 410 that processes signaling used in the EPC 420 is present. In the EPC 420, a relay node (SGW: Serving GateWay) 404 and an SGW 414 that relay data between the PGW 416 and the eNB 402 or the eNB 412 and perform a signaling process in the EPC 420 are present. Further, the PGW 416 also performs the signaling process in the EPC 420.

Handover of the UE 100 disclosed in NPL 1 is performed using the PGW 416 as an anchor point. Hereinafter, a handover processing method in the UE 100 will be described with reference to FIGS. 21 and 22.

As disclosed in NPL 1, a radio communication path (RB: Radio Bearer) is established between the UE 100 and the eNB 402. Each communication path (bearer) is established between the eNB 402 and the SGW 404 and between the SGW 404 and the PGW 416, and thus binding information of the communication paths are retained in the eNB 402 and the SGW 404. Further, the bearer established between the eNB and the SGW is referred to as an S1 bearer and the bearer established between the SGW and the PGW is referred to as an S5/S8 bearer.

The eNB 402 compares situations in which the UE 100 receives radio signals from the eNB 402 and a neighboring eNB and determines handover of the UE 100 (step s502). Next, by performing signaling transmission and reception between the SGW 414 and the eNB 412, the S1 bearer between the eNB 412 and the SGW 414 is established as a new communication path formed via the MME 410 and the S5/S8 bearer is established between the SGW 414 and the PGW 416 (step s504 to step s512). At this time, when the UE 100 switches a wireless connection destination from the eNB 402 to the eNB 412, RB is established between the UE 100 and the eNB 412 (step s514 to step s516).

The binding information of the RB and the S1 bearer is retained in the eNB 412 and the binding information of the S1 bearer and the S5/S8 bearer is retained in the SGW 414. Further, data having been transmitted to the eNB 402 is transmitted (not shown) to the eNB 412, while a data transmission path is established (not shown) between the eNB 402 and the eNB 412 via the SGW 404 and the SGW 414 during step s504 to step s516 and the UE 100 switches the connection destination from the eNB 402 to the eNB 412. When the UE 100 completely switches the connection destination to the eNB 412, a bearer updating process is completed in the EPC 420 (step s516 to step s528) and the handover of the UE 100 is completed.

NPL 1 does not support handover involving the change in the PGW. When the PGW is changed, an IP address allocated to the UE is also changed and a new bearer is also established. Therefore, session with the communication destination is disconnected. An example in which a gateway node is changed by movement of the UE is disclosed in NPL 2. NPL 2 discloses a case in which a UE connected locally to a house network (home network) from a home access point (HeNB: Home e NodeB) moves out of a house and attempts remote connection to the home network from an eNB which is an access point out of the house.

An example in which home network connection (local access) is attempted by performing wireless connection to the HeNB, as disclosed in NPL 2, will be described with reference to FIG. 23. A network 616 is an IP-based network and is the same as the network 406 described above. The EPC 632 connected to the network 616 and a node having the configuration of the EPC 632 are the same as the EPC 420 described above. In a house 630, an individual network (home network 614) of a home, a corporation, or the like is present.

The home network 614 is one of the IP-based networks and is connected to an external network 616 via a broadband router (BB router) 610. In the home network 614, an access point (HeNB) 602 which is a wireless access point of the UE 100 present in the house 630 and a local gateway node (L-PGW: Local Packet data network GateWay) 606, which is a local connection gateway of the home network 614 and serves as a handover anchor point, are present.

A communication destination node 612 performing data communication with the UE 100 is connected to the home network 614.

In the home network 614, a home gateway 608 that manages a node connected to the home network 614 and makes connection from the outside to the home network 614 via the network 616 is present. In the home network 614, a relay node (L-SGW: Local Serving GateWay) 604 that relays data between the L-PGW 606 and the HeNB 602 and performs signaling processing in the house 630 is also present. Further, the L-PGW 606 also performs the signaling processing with the EPC 632.

The HeNB 602 is connected to a termination node (a node (not shown) or the SGW 622) in the EPC 632 via the BB router 610 and the network 616. The UE 100 connected to HeNB 602 can communicate with the network 616 via the EPC 632. Further, the HeNB 602, the L-SGW 604, and the L-PGW 606 may be physically configured as a single node and is treated as an HeNB or may be treated as a single HeNB including the home gateway 608.

When the UE 100 connected to the HeNB 602 performs data communication with the communication destination node 612, a bearer is established among the UE 100, the HeNB 602, the L-SGW 604, and the L-PGW 606, as indicated by a dotted line in FIG. 24. The establish of this bearer is performed via the MME 620 of the EPC 632. When the bearer is established, the UE 100 acquires an IP address used in the home network 614 from the L-PGW 606. The UE 100 performs the data communication with the communication destination node 612 using this IP address.

On the other hand, when the UE 100 is connected to the eNB 624 and performs the data communication (remote access) with the communication destination node 612, a method of establishing a bearer between the eNB 624 and the L-PGW 606 is not described in the current 3GPP specification. Therefore, for example, as indicated by a one-dot chain line in FIG. 24, a bear is established via the eNB 624, the SGW 622, and the PGW 618. Then, the UE 100 acquires the IP address used in the network 616 from the PGW 618, is connected to the home gateway 608 via the network 616 and the BB router 610 and performs the data communication with the communication destination node 612 via the home gateway 608. The connection from the UE 100 to the home gateway 608 can be realized in accordance with a method of using a SIP (Session Initiation Protocol) or the like described in, for example, NPL 3.

The IP address allocated to the UE 100 is different between when the UE 100 is connected to the HeNB 602 and performs the data communication with the communication destination node 612 and when the UE 100 is connected to the eNB 624 and performs the data communication with the communication destination node 612. Therefore, the UE 100 performs a process in accordance with different data flows. Accordingly, a mobile IP is disclosed in NPL 4 and NPL 5 as a method of performing the process in accordance with the same data flow even when the IP address of the UE is changed. The mobile IP is a technology for enabling the UE to continue the communication using the same IP address by providing binding information of the IP address to a Home Agent node present in the midway of a communication path even when the IP address of the UE is changed. Accordingly, even when the UE 100 changes a connection destination from the HeNB 602 to the eNB 624 and continues the communication with the communication destination node 612, the UE 100 can perform the process in accordance with the same data flow as long as the function of the Home Agent node is provided to the home gateway 608 or the like.

However, since this method does not support the handover of the UE 100 disclosed in NPL 1, the UE 100 does not transmit data and transmission of the data to the UE 100 is thus interrupted during a process of switching the connection destination and a process of performing connection with the home gateway 608. Since the smallest interruption time is 1 second, this value may not be ignored in real-time communication.

In regard to the data transmission, for example, NPL 6 describes a method of transmitting the data to an access router of a handover destination during handover of a mobile terminal.

Further, PTL 1 discloses a method of continuously receiving a context using an access controller connected to a plurality of access networks, even when a mobile terminal is moved to another access network.

CITATION LIST

Patent Literature

[PTL 1] Japanese Patent Publication No. JP-A-2006-74741

Non Patent Literature

[NPL 1] "General Packet Radio Service (GPRS) enhancements for Evolved Universal Terrestrial Radio Access Network (E-UTRAN) access", 3GPP TS 23.401V9.3.0, December 2009

[NPL 2] "Architecture aspects of Home NodeB and Home eNodeB", 3GPP TR23. 830 V9.0.0, September 2009

[NPL 3] J. Rosenberg, H. Schulzrinne, G. Camarillo, A. Johnston, J. Peterson, R. Sparks, M. Handley, E. Schooler, "SIP: Session Initiation Protocol", RFC3261, June 2002

[NPL 4] C. Perkins, Ed., "IP Mobility Support for IPv4", RFC3344, August 2002

[NPL 5] D. Johnson, C. Perkins, J. Arkko, "Mobility Support in IPv6", RFC3775, June 2004

[NPL 6] R. Koodli, Ed., "Mobile IPv6 Fast Handovers", RFC5568, July 2009

SUMMARY OF INVENTION

Technical Problem

In the method disclosed in NPL 6 described above, however, address information of a link layer of the mobile terminal is used in the access router. Therefore, the address information may not be used in a terminal that has no address of the link layer, as in a cellular phone.

Further, as disclosed in PTL 1, the context remains cached in the access controller, until the mobile terminal is connected from a first access network to a second access network. Therefore, a delay occurs until the mobile terminal is connected to the second access network and the context is transmitted to the mobile terminal.

An object of the invention is to provide a mobile wireless system, an access point device, and a handover processing method capable of shortening an interruption time of data reception involved in handover of a mobile terminal, when the mobile terminal performs the handover between networks in which handover anchor points are different from each other.

Solution to Problem

According to one aspect of the present invention, there is provided a mobile wireless system in which a mobile terminal performs handover between networks in which handover anchor points are different from each other, comprising:

first and second gateway nodes which are the different handover anchor points;

a first access point device which is able to establish communication paths with both the first and second gateway nodes simultaneously; and a second access point device which is able to establish a communication path only with the second gateway node, wherein when the mobile terminal connected to the first access point device and being communicating with a communication destination node using a first communication path passing through the first gateway node switches a connection destination from the first access point device to the second access point device, the first access point device establishes a second communication path passing through the first access point device and the second gateway node, while maintaining the communication along the first communication path, before the first access point device disconnects the connection from the mobile terminal, and the first access point device transmits data, which has been transmitted from the communication destination node to the first access point device along the first communication path, to the second access point device along the second communication path, until the connection between the mobile terminal and the first access point device is disconnected, the mobile terminal is connected to the second access point device, and a third communication path passing through the second gateway node and reaching the communication destination node is established.

The above described mobile wireless system may further comprise: in a network including the second access point device and the second gateway node, a signaling processing node configured to transmit information regarding the second gateway node to the first access point device based on information transmitted from the mobile terminal involved in the handover.

In the above described mobile wireless system, the signaling processing node may transmit the information regarding the second gateway node to the first access point device, after the mobile terminal determines the connection destination from the first access point device to the second access point device.

In the above described mobile wireless system, when the mobile terminal connected to the second access point device and being communicating with the communication destination node using the third communication path passing through the second gateway node may switch the connection destination from the second access point device to the first access point device, the first access point device establishes a fourth communication path passing the first access point device and the second gateway node, while maintaining the communication along the third communication path, before the second access point device disconnects the connection from the mobile terminal, and the first access point device receives data transmitted from the communication destination node along the fourth communication path, until the connection between the mobile terminal and the second access point device is disconnected, the mobile terminal is connected to the first access point device, and the first communication path passing through the first gateway node and reaching the communication destination node is established.

In the above described mobile wireless system, the mobile terminal may receive the data along a communication path passing through the second gateway node and the first access point device from the communication destination node, while the mobile terminal switches the connection destination from the first access point device to the second access point device.

In the above described mobile wireless system, the first communication path may be formed by a plurality of communication paths, while the mobile terminal and the communication destination node communicate with each other in the same network, and the first access point device may form the second communication path so that the second communication path is formed by communication paths of the same number as at least one communication path selected from the plurality of communication paths forming the first communication path, when the mobile terminal performs is the handover between the different networks.

In the above described mobile wireless system, data transmitted in the network or between the networks may include a core portion and at least one extension portion subordinate to the core portion, while the mobile terminal and the communication destination node communicate with each other in the same network, the first communication path may include a core portion communication path along which the core portion is transmitted and an extension portion communication path along which the extension portion is transmitted, and the first access point device may transmit only data of the core portion along the second communication path, when the mobile terminal performs the handover to another network.

According to another aspect of the present invention, there is provided an access point device which is able to establish communication paths simultaneously with both first and second gateway nodes serving as different handover anchor points when a mobile terminal performs handover between networks in which the handover anchor points are different from each other, wherein when the mobile terminal connected to the access point device and being communicating with a communication destination node using a first communication path passing through the first gateway node switches a connection destination from the access point device to another access point device which is able to establish a communication path only with the second gateway node, the access point device establishes a second communication path passing through the access point device and the second gateway node, while maintaining the communication along the first communication path, before the access point device disconnects the connection from the mobile terminal, and the access point device transmits data, which has been transmitted from the communication destination node to the access point device along the first communication path, to another access point device along the second communication path, until the connection between the mobile tell terminal and the access point device is disconnected, the mobile terminal is connected to another access point device, and a third communication path passing through the second gateway node and reaching the communication destination node is established.

According to still another aspect of the present invention, there is provided A handover processing method in a mobile wireless system including first and second gateway nodes which are different handover anchor points, a first access point device that is able to establish communication paths with both the first and second gateway nodes simultaneously, and a second access point device that is able to establish a communication path only with the second gateway node, wherein when the mobile terminal connected to the first access point device and being communicating with a communication destination node using a first communication path passing through the first gateway node switches a connection destination from the first access point device to the second access point device, the first access point device establishes a second communication path passing through the first access point device and the second gateway node, while maintaining the communication along the first communication path, before the first access point device disconnects the connection from the mobile terminal, and the first access point device transmits data, which has been transmitted from the communication destination node to the first access point device along the first communication path, to the second access point device along the second communication path, until the connection between the mobile terminal and the first access point device is disconnected, the mobile terminal is connected to the second access point device, and a third communication path passing through the second gateway node and reaching the communication destination node is established.

Advantageous Effects of Invention

The mobile wireless system, the access point device, and the handover processing method according to the aspects of the invention can shorten an interruption time of data reception involved in handover of a mobile terminal, when the mobile terminal performs the handover between networks in which handover anchor points are different from each other.

BRIEF DESCRIPTION OF DRAWINGS

FIG. 28 is a diagram illustrating an example of the structure of sound (or an image or a moving image) data generated by a codec used in the VoIP or the like.

FIG. 30 is a sequence chart illustrating an example of a process signaling sequence according to the sixth embodiment.

DESCRIPTION OF EMBODIMENTS

Hereinafter, embodiments of the invention will be described with reference to the drawings.

First Embodiment

Figure 1:
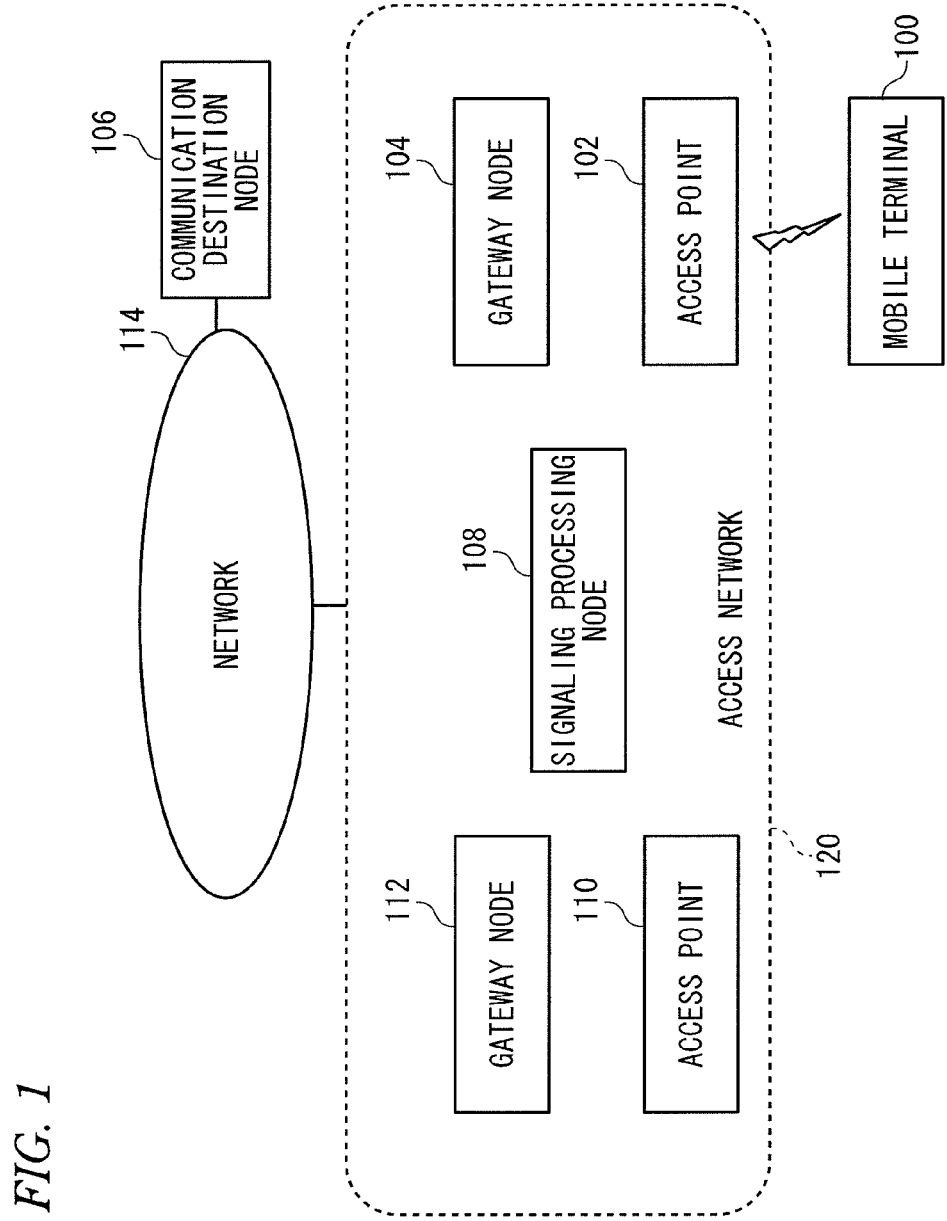
FIG. 1 is a block diagram illustrating an example of a mobile communication system according to first to seventh embodiments.

A first embodiment of the invention will be described with reference to FIGS. 1 to 3 and 23. FIG. 1 is a diagram illustrating a part of the configuration of a network according to the first embodiment. A network 114 is a collection of IP-based networks, such as the Internet or an ISP (Internet Service Provider). An access network 120 is an access network connected to the network 114. In the access network 120, an access point 102 and an access point 110, which are wireless access points of a mobile terminal 100, and a gateway node 104 and a gateway node 112, which are connection gateways of the network 114 and serve as handover anchor points, are present.

A communication destination node 106 that can perform communication of IP packet data (hereinafter, simply referred to as "data") with the mobile terminal 100 is connected to the network 114. In the access network 120, a signaling processing node 108 that processes signaling used in the access network 120 may be also present. The configuration of the network shown in FIG. 1 is applied to the configuration of a network shown in FIG. 23.

When the mobile terminal 100 performs data communication with the communication destination node 106, the mobile terminal 100 first establishes a communication path (hereinafter, referred to as a "bearer") with the access network 120. That is, the bearer is a communication path that logically connects the mobile terminal 100 to the gateway node and the access point selected when the mobile terminal 100 is connected to the network 114.

Here, the following three assumptions are made for the communication path established in the access network 120.

(1) When the mobile terminal 100 is wirelessly connected to the access point 102, a communication path (first communication path) formed along the mobile terminal 100, the access point 102, and the gateway node 104 and a communication path (second communication path) formed along the mobile terminal 100, the access point 102, and the gateway node 112 can be established.

(2) When the mobile terminal 100 is wirelessly connected to the access point 110, a communication path (third communication path) formed along the mobile terminal 100, the access point 110, and the gateway node 112 can be established.

(3) The first and second communication paths can be simultaneously established. However, the first and third communication paths are not simultaneously established and the second and third communication paths are not simultaneously established.

Further, when the mobile terminal 100 uses a communication path passing through the same gateway node by switching the access point of the connection destination, that is, when the mobile terminal 100 performing the data communication with the communication destination node 106 along the second communication path performs the data communication with the communication destination node 106 along the third communication path by switching the connection destination from the access point 102 to the access point 110, the data transmitted from the communication destination node 106 to the access point 102 along the second communication path is transmitted from the access point 102 to the access point 110 until the connection from the mobile terminal 100 to the access point 102 is disconnected and the mobile terminal 100 is connected to the access point 110 to establish the third communication path. At this time, a path for the data transmission is newly established between the access points 102 and 110.

The process of establishing the communication path and the process of establishing the data transmission path may be performed via the signaling processing node 108. Further, the mobile terminal 100 is not allowed to be simultaneously connected to the access points 102 and 110.

Hereinafter, according to the first embodiment a case will be described in which the mobile terminal 100 switches the connection destination from the access point 102 to the access point 110 during the data communication with the communication destination node 106 along the first communication path and continues the data communication with the communication destination node 106. The mobile terminal 100 establishes the second communication path during the connection with the access point 102. At this time, the data from the communication destination node 106 is transmitted to the mobile terminal 100 along the first communication path, but the data is processed to be transmitted along the second communication path by the access point 102.

Thus, the path for the data transmission is established between the access points 102 and 110, until the connection between the mobile terminal 100 and the access point 102 is disconnected and the mobile terminal 100 is connected to the access point 110 so that the third communication path is established. The access point 102 transmits the data, which has been transmitted from the communication destination node 106 to the access point 102 via the network 114 and the gateway node 104, to the access point 110 along the path for the above-described data transmission. Accordingly, the mobile terminal 100 connected to the access point 110 can receive the data transmitted to the access point 110.

The mobile terminal 100 may be the UE 100 disclosed in NPL 1. The access points 102 and 110 may be the HeNB 402 and the eNB 412 disclosed in NPL 1, respectively. The gateway node 104 may be the L-PGW 606 disclosed in NPL 2. The gateway node 112 may be PGW 416 disclosed in NPL 1 or may be the PGW 618 disclosed in NPL 2. The gateway nodes 104 and 112 may have the function of the relay node (the SGW or the L-SGW) disclosed in NPL 1 and NPL 2. The signaling processing node 108 may be the MME 410 disclosed in NPL 1.

Figure 2:
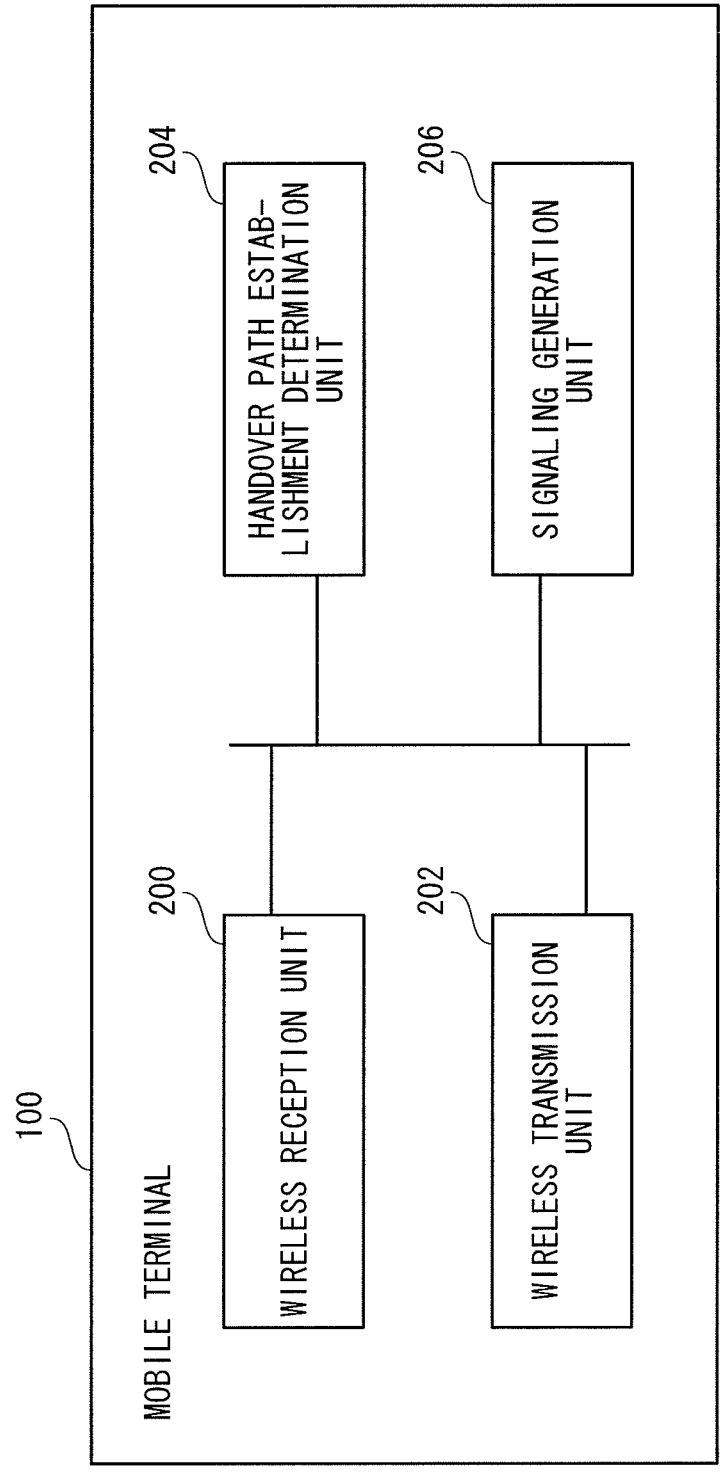
FIG. 2 is a block diagram illustrating an example of the configuration of a mobile terminal according to a first embodiment.

FIG. 2 is a block diagram illustrating an example of the configuration of the mobile terminal 100 according to the first embodiment. As shown in FIG. 2, the mobile terminal 100 includes a wireless reception unit 200, a wireless transmission unit 202, a handover path establishment determination unit 204, and a signaling generation unit 206. The wireless reception unit 200 receives a radio signaling. The wireless transmission unit 202 transmits a radio signaling. When the mobile terminal 100 switches the connection to an access point (for example, the access point 110) in the neighborhood of the mobile terminal 100, the handover path establishment determination unit 204 detects that a gateway node (for example, the gateway node 104) through which the currently used communication path passes is not available, and establishes a handover communication path passing through the gateway node (for example, the gateway node 112) also available in a connection switching destination.

Figure 3:
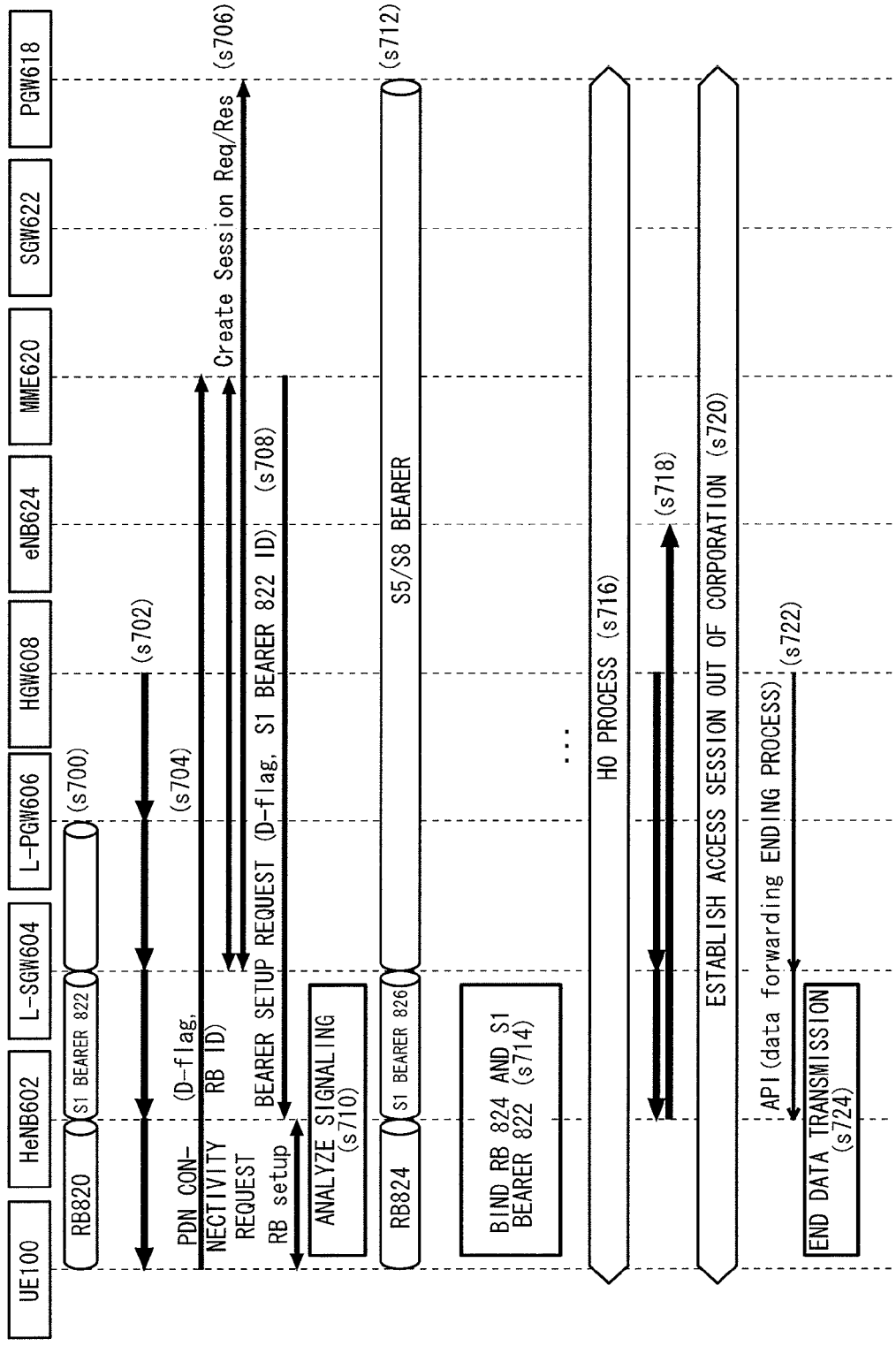
FIG. 3 is a sequence chart illustrating an example of a process signaling sequence according to the first embodiment.
Figure 23:
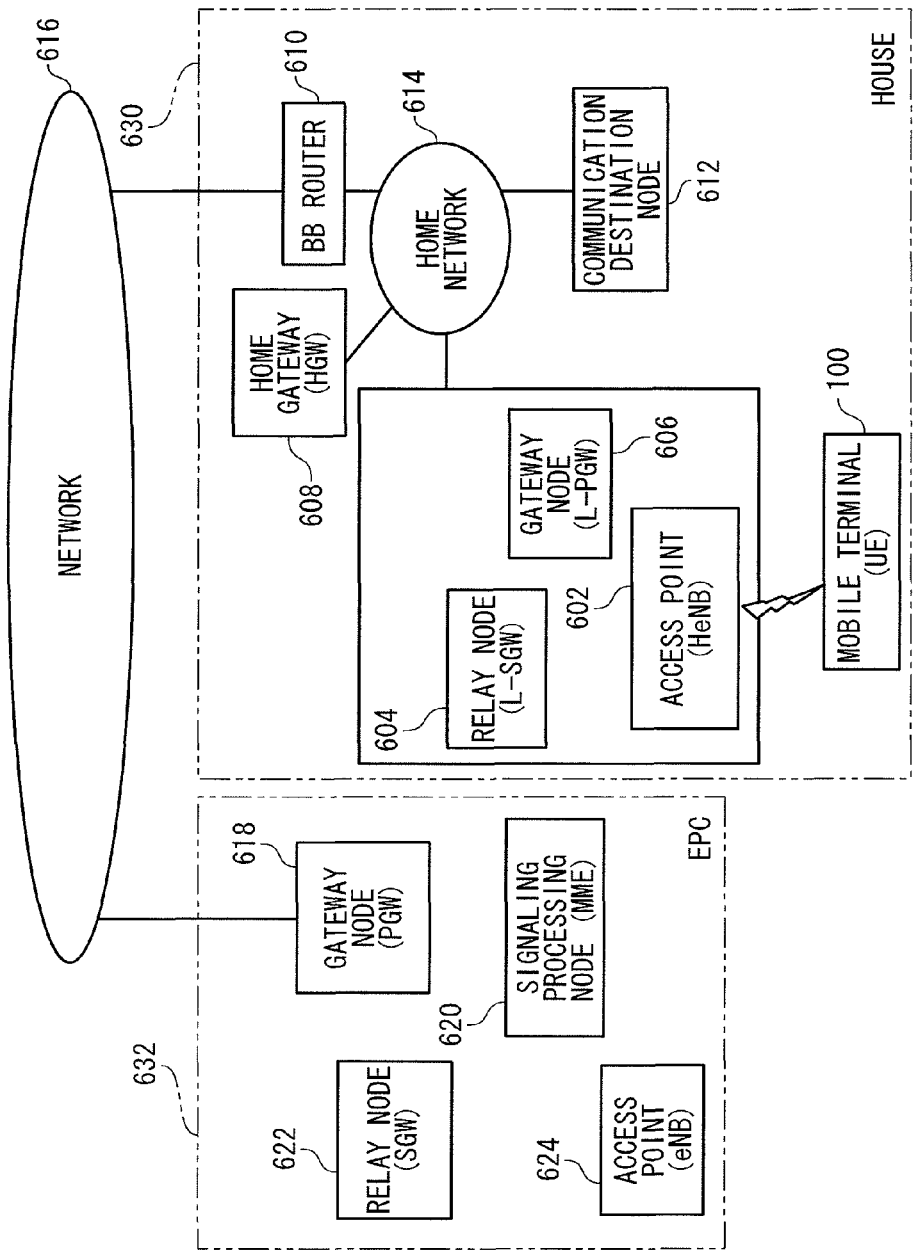
FIG. 23 is a diagram illustrating an example of a relation between an EPC and a home network including a home HeNB 602 in a house to which a UE 100 can be connected wirelessly (local access).
Figure 24:
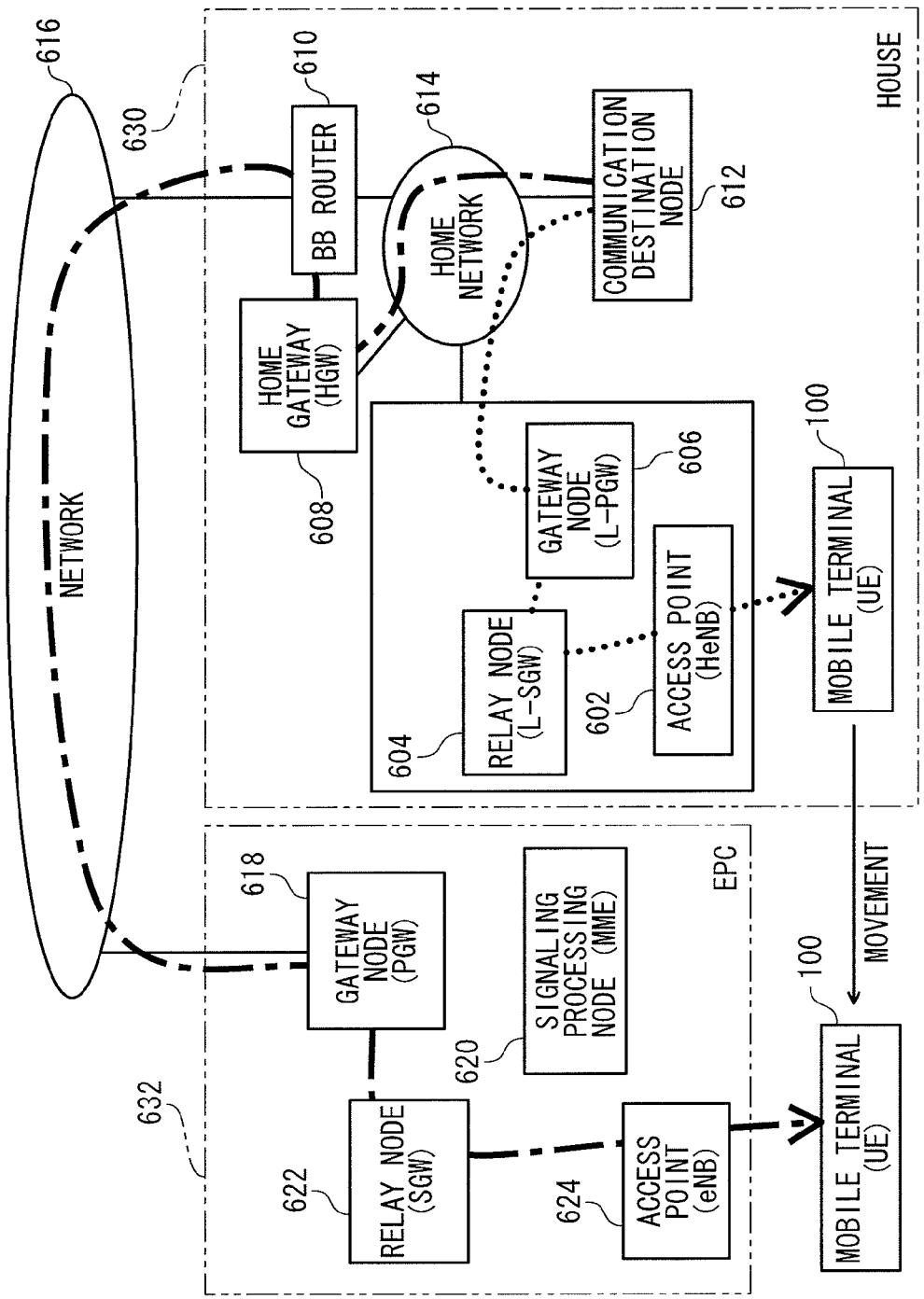
FIG. 24 is a diagram illustrating a session when the UE 100 connected wirelessly to the HeNB 602 or an eNB 624 performs data communication with a communication destination node 612.

Hereinafter, an example of an operation of the handover path establishment determination unit 204 of the UE 100 will be described based on the configuration of the network shown in FIG. 23 with reference to FIGS. 3 and 4. Currently, the UE 100 is wirelessly connected to the HeNB 602 and is performing data communication with the communication destination node 612 via the L-SGW 604 and the L-PGW 606. That is, the UE 100 is performing the data communication in a local access manner. The data communication may be performed via the home gateway (HGW) 608 (step s702). At this time a radio bearer (RB) 820 is established between the UE 100 and the HeNB 602, an S1 bearer 822 is established between the HeNB 602 and the L-SGW 604, and an S5/S8 bearer is established between the L-SGW 604 and the L-PGW 606 (step s700).

The binding information is retained in the HeNB 602 and the L-SGW 604. When the mobile terminal 100 is connected to the HeNB 602, the handover path establishment determination unit 204 recognizes that the above-described bearer is bound from a CSG ID (Closed Subscriber Group IDentifier) or a connection destination APN (Access Point Name) disclosed in NPL 1 to the L-PGW 606 and the communication path is thus established. Then, before the connection is switched from the HeNB 602 to the eNB 624, the handover path establishment determination unit 204 determines a communication path between the communication destination node 612 of a subordinate of the eNB 624 and the PGW 618 enabling the data communication, that is, determines the establishment of a remote access communication path. Here, "binding the bearer" means that all of the data output from one bearer are set so as to be transmitted to the other bearer.

The signaling generation unit 206 generates a signaling used to establish the handover communication path. The signaling includes not only a normal parameter used to establish a communication path passing through a gateway node (for example, the gateway node 112) usable even in the connection switching destination but also a parameter used to instruct data transmitted along the currently used communication path to the currently connected access point (for example, the access point 102) to be treated as data transmitted along the communication path established by this signaling.

Hereinafter, an example of an operation of the signaling generation unit 206 of the UE 100 will be described based on the configuration of the network shown in FIG. 23 with reference to FIGS. 3 and 4. When a handover communication path is established with the PGW 618, the UE 100 connected to the HeNB 602 generates a PDN connectivity request, as described in NPL 1. The PDN connectivity request includes a flag (D-flag) indicating that the bearer established by this request is the bearer for the handover and the ID (RB ID) of the RB 820 currently used for a local access in addition to the normal parameter (step s704).

When the MME 620 receives the PDN connectivity request, as described in NPL 1, the MME 620 retrieves the connection destination PGW and the SGW serving as a relay node based on the connection destination APN included in the signaling and transmits the signaling to establish the S1 bearer and the S5/S8 bearer (step s706). Further, when the MME 620 retrieves the PGW and the SGW, the D-flag may be considered. When the MME 620 transmits a bearer setup request to the HeNB 602, the signaling includes the D-flag and the ID of the RB 820 in the PDN connectivity request transmitted in step s704 (step s708). Therefore, the handover communication path (bearer) is established between the UE 100 and the PGW 618.

Figure 5:
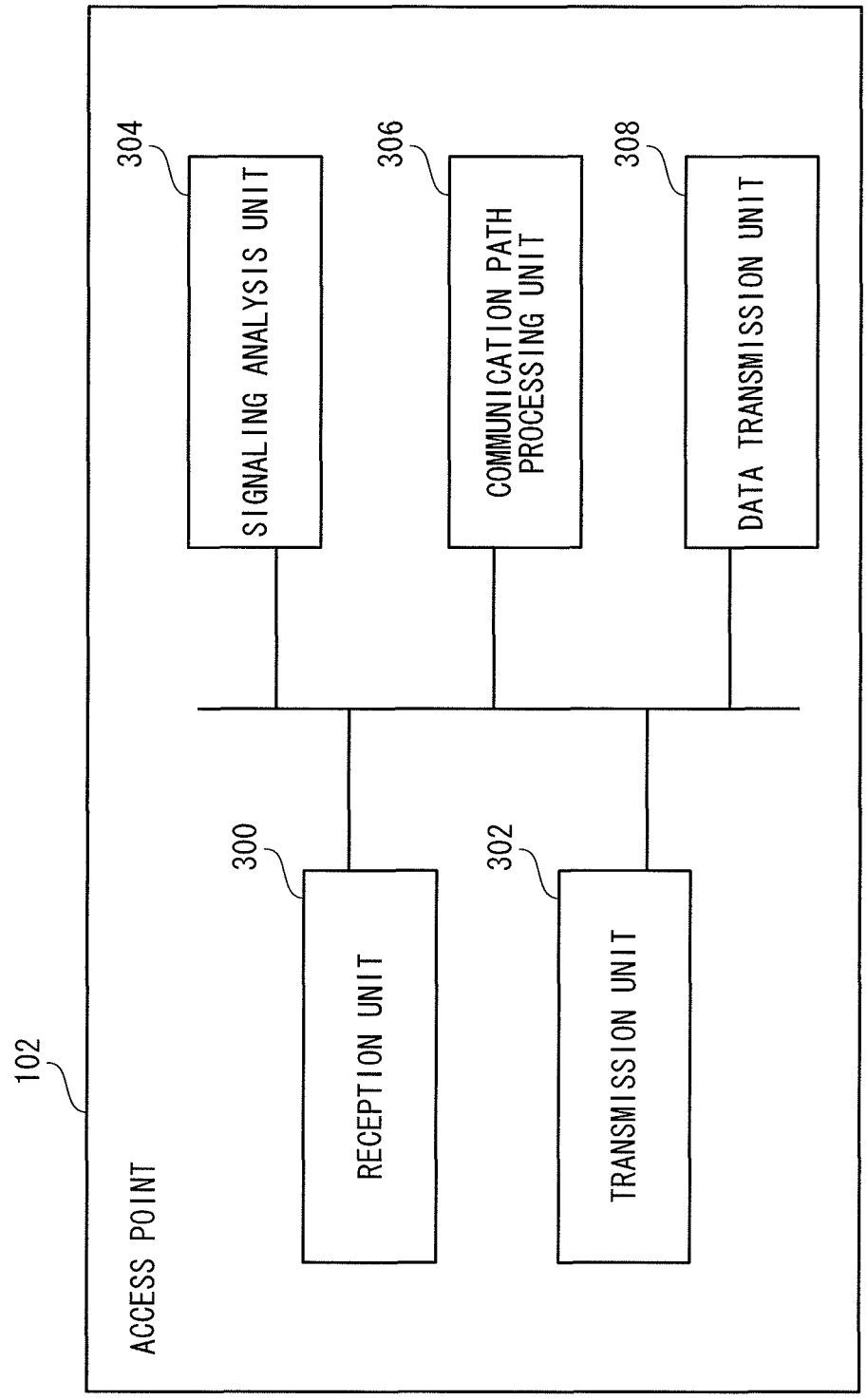
FIG. 5 is a block diagram illustrating an example of the configuration of an access point according to the first embodiment.

FIG. 5 is a block diagram illustrating an example of the configuration of the access point 102 according to the first embodiment. As shown in FIG. 5, the access point 102 includes a reception unit 300, a transmission unit 302, a signaling analysis unit 304, a communication path processing unit 306, and a data transmission unit 308. The reception unit 300 receives a signaling. The transmission unit 302 transmits a signaling. The signaling analysis unit 304 analyzes the received signaling to confirm whether the received signaling includes a parameter for establishing a handover communication path, that is, includes a parameter used to instruct the data transmitted along the communication path for the local access currently used by the UE 100 to be treated as data transmitted along the remote access communication path established by the signaling.

Hereinafter, an example of each operation of the signaling analysis unit 304 and the communication path processing unit 306 of the HeNB 602 will be described based on the configuration of the network shown in FIG. 23 with reference to FIGS. 3 and 4. The signaling analysis unit 304 analyzes the bearer setup request transmitted from the MME 620, as described in NPL 1, to confirm whether the bearer setup request includes the above-described D-flag and the ID of the S1 bearer 822 currently used by the UE 100 (step s710). When the bearer setup request includes this parameter, the communication path processing unit 306 treats the data transmitted along the communication path currently used by the UE 100 as the data transmitted along the communication path established by the signaling.

Figure 4B:
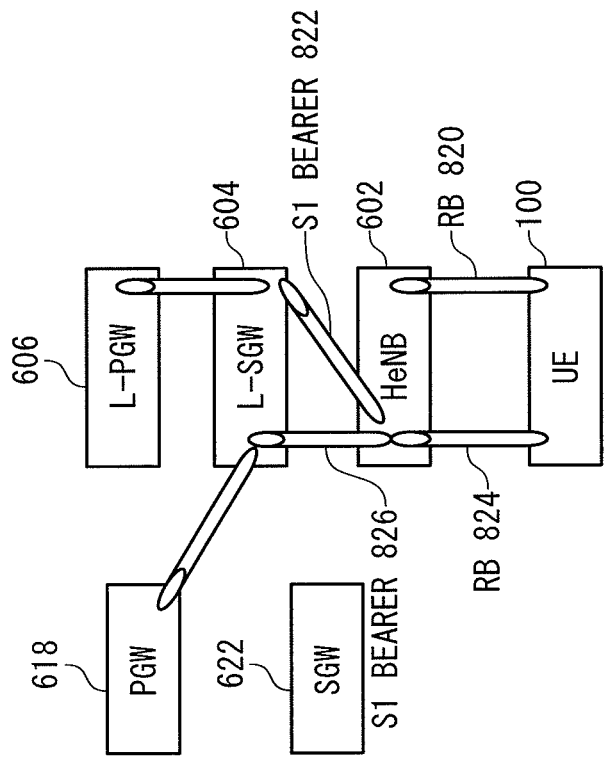
FIG. 4A is a diagram illustrating an example of binding of a bearer when an RB 820 is disconnected from an S1 bearer 822 and FIG. 4B is a diagram illustrating an example of binding of a bearer when the S1 bearer 822 is connected to an RB 824.
Figure 4A:
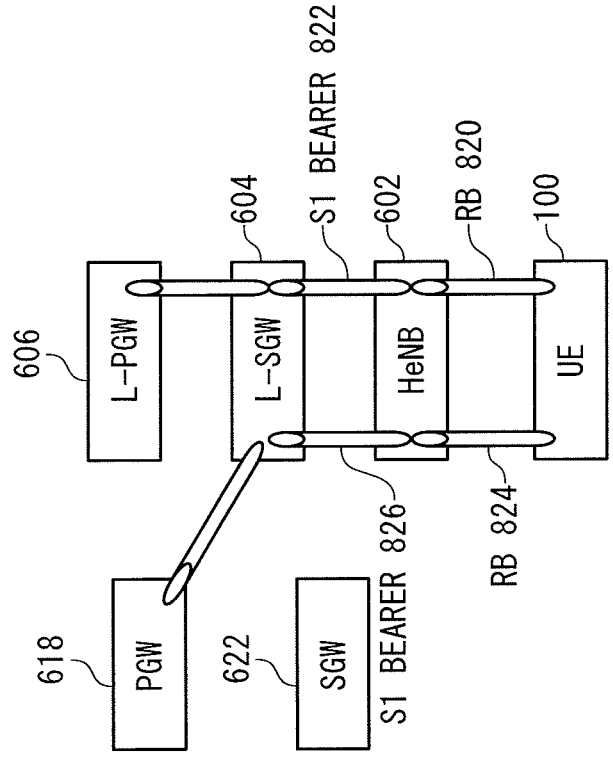

The communication path processing unit 306 retrieves the ID of the RB 820 connected to the ID of the S1 bearer 822 from the ID of the S1 bearer 822 included in the bearer setup request and currently used for the local access by the UE 100, disconnects the RB 820 from the currently connectable S1 bearer 822, and binds the S1 bearer 822 to the RB 824 newly established by the bearer setup request (step s714). FIG. 4A is a diagram illustrating a state before the RB 820 is disconnected from the S1 bearer 822. FIG. 4B is a diagram illustrating a state after the S1 bearer 822 is bound to the RB 824.

When the UE 100 switches the connection destination to the access point 110, the data transmission unit 308 transmits the data, which has been transmitted from the communication destination node 106 to the access point 102 via the gateway node 104, to a data transmission tunnel established between the access points 102 and 110, as described in NPL 1. Further, a transmission starting timing and a transmission ending timing may be instructed from another node.

Hereinafter, an example of an operation of the data transmission unit 308 of the HeNB 602 will be described based on the configuration of the network shown in FIG. 23 with reference to FIGS. 3 and 4. In the handover process disclosed in NPL 1, the data transmission tunnel is established between the HeNB 602 and the eNB 624. The data transmission unit 308 starts transmitting the data, which has been transmitted from the communication destination node 612 to the UE 100 via the communication path for the local access, from the HeNB 602 to the eNB 624 in accordance with the method disclosed in NPL 1 (step s718). When the UE 100 completes the handover to the eNB 624 and completely establishes the session with the home gateway 608 in accordance with a method such as the above-described SIP (step s720), the home gateway 608 transmits a data transmission ending instruction to the HeNB 602 (step s722). The data transmission unit 308 ends the data transmission in response to the data transmission ending instruction (step s724).

The timing at which the RB 824 and the S1 bearer 822 are bound to each other in step s714 may be a timing at which the HeNB 602 determines the handover of the UE 100, that is, may be a timing immediately before an Handover Required signaling is transmitted to the MME 620.

According to the embodiment of the invention, as described above, when the mobile terminal performs handover between the networks in which handover anchor points are different from each other, the data is not transmitted along a redundant path. Accordingly, it is possible to shorten the interruption time of data reception involved in handover of a mobile terminal.

Second Embodiment

A second embodiment of the invention will be described with reference to FIGS. 1, 6 to 10, and 23. According to the second embodiment, in the configuration of the network shown in FIG. 1, a handover communication path establishing request transmitted to the access point 102 is not transmitted from the mobile terminal 100, but is transmitted from the signaling processing node 108.

Figure 6:
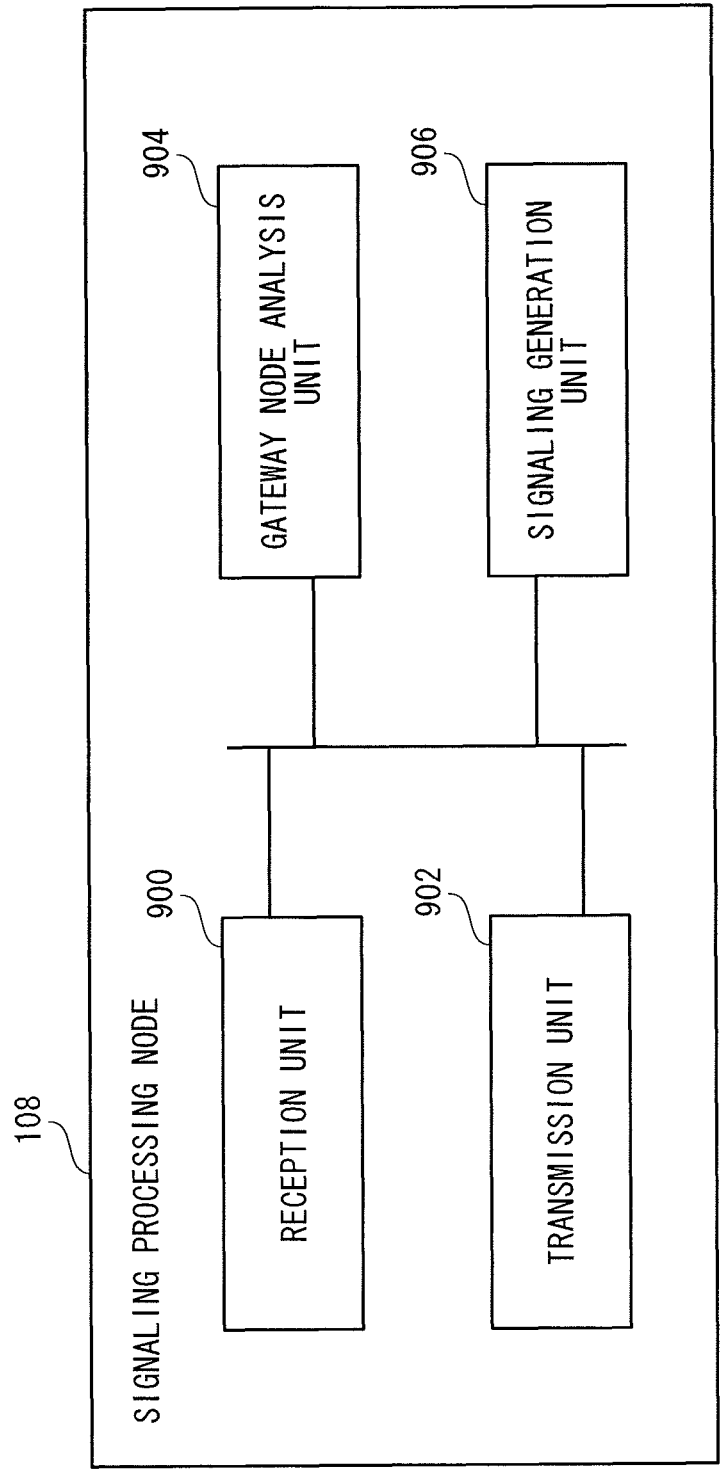
FIG. 6 is a block diagram illustrating an example of the configuration of a signaling processing node according to a second embodiment.

FIG. 6 is a block diagram illustrating an example of the configuration of the signaling processing node 108 according to the second embodiment. The signaling processing node 108 shown in FIG. 6 includes a reception unit 900, a transmission unit 902, a gateway node analysis unit 904, and a signaling generation unit 906. The reception unit 900 receives a signaling. The transmission unit 902 transmits a signaling. When the gateway node analysis unit 904 retrieves a gateway node of a communication path establishment destination in response to a communication path establishing request from the mobile terminal 100 and consequently retrieves a plurality of gateway nodes, the gateway node analysis unit 904 analyzes the characteristics of the retrieved gateway nodes.

Hereinafter, an example of an operation of the gateway node analysis unit 904 of the MME 620 will be described based on the configuration of the network shown in FIG. 23 with reference to FIG. 7. To start data communication with the communication destination node 612 via the L-PGW 606, the UE 100 transmits the PDN connectivity request to the MME 620 (step s1100). When the MME 620 receives the PDN connectivity request, as described in NPL 1, the MME 620 retrieves a connection destination PGW and an SGW serving as a relay node based on connection destination APN included in the signaling. At this time, the L-PGW 606 is retrieved as a primary PGW and the PGW 618 is retrieved as a secondary PGW (step s1102).

Based on the retrieval result, the MME 620 determines that the primary PGW (L-PGW 606) is the L-PGW for which the UE 100 currently gives a connection request to perform the data communication with the home network 614 in the local access manner, and determines that the secondary PGW (PGW 618) is the PGW to which the UE 100 is connected by switching the connection destination to the eNB 624 to perform the data communication with the home network 614 in a remote access manner. Further, as a reference used for the MME 620 to perform the determination, a parameter indicating the PGW for the home network communication (local access) explicitly from the HeNB may be used or a parameter indicating the PGW for the home network communication (remote access) from the eNB, or the IP address of the gateway node may be used. Further, the PGW 618 may be retrieved together with the above-described D-flag included in the PDN connectivity request.

Based on the characteristics of the gateway analyzed by the gateway node analysis unit 904, the signaling generation unit 906 generates a signaling used to instruct the access point 102 to process the data transmitted along the communication path passing through one of the retrieved gateway nodes as the data transmitted along the communication path passing through another gateway node of the retrieved gateway nodes. Further, the communication paths may have a one-to-one relationship or a plurality-to-plurality relationship.

Hereinafter, an example of an operation of the signaling generation unit 906 of the MME 620 will be described based on the configuration of the network shown in FIG. 23 with reference to FIG. 7. The signaling generation unit 906 generates a signaling used to establish a bearer via the L-SGW 604 for all of the PGWs retrieved in step s1102, that is, the L-PGW 606 and the PGW 618, the transmission unit 902 transmits the signaling, and the reception unit 900 receives a response to the signaling (step s1104 and step s1106). Thereafter, the signaling generation unit 906 generates the signaling so that the signaling includes an instruction to bind both the S1 bearer 822 and the S1 bearer 826 having the relation shown in FIG. 4A to the RB 824 which can originally be connected to the S1 bearer 826 during the bearer setup request transmitted from the MME 620 to the HeNB 602 (step s1108). As an example of the method of including this instruction, the D-flag, the ID of the S1 bearer 822, and the ID of the S1 bearer 826 described above are included in this order as parameters so that the HeNB 602 receiving this signaling can determine the instruction.

Figure 8:
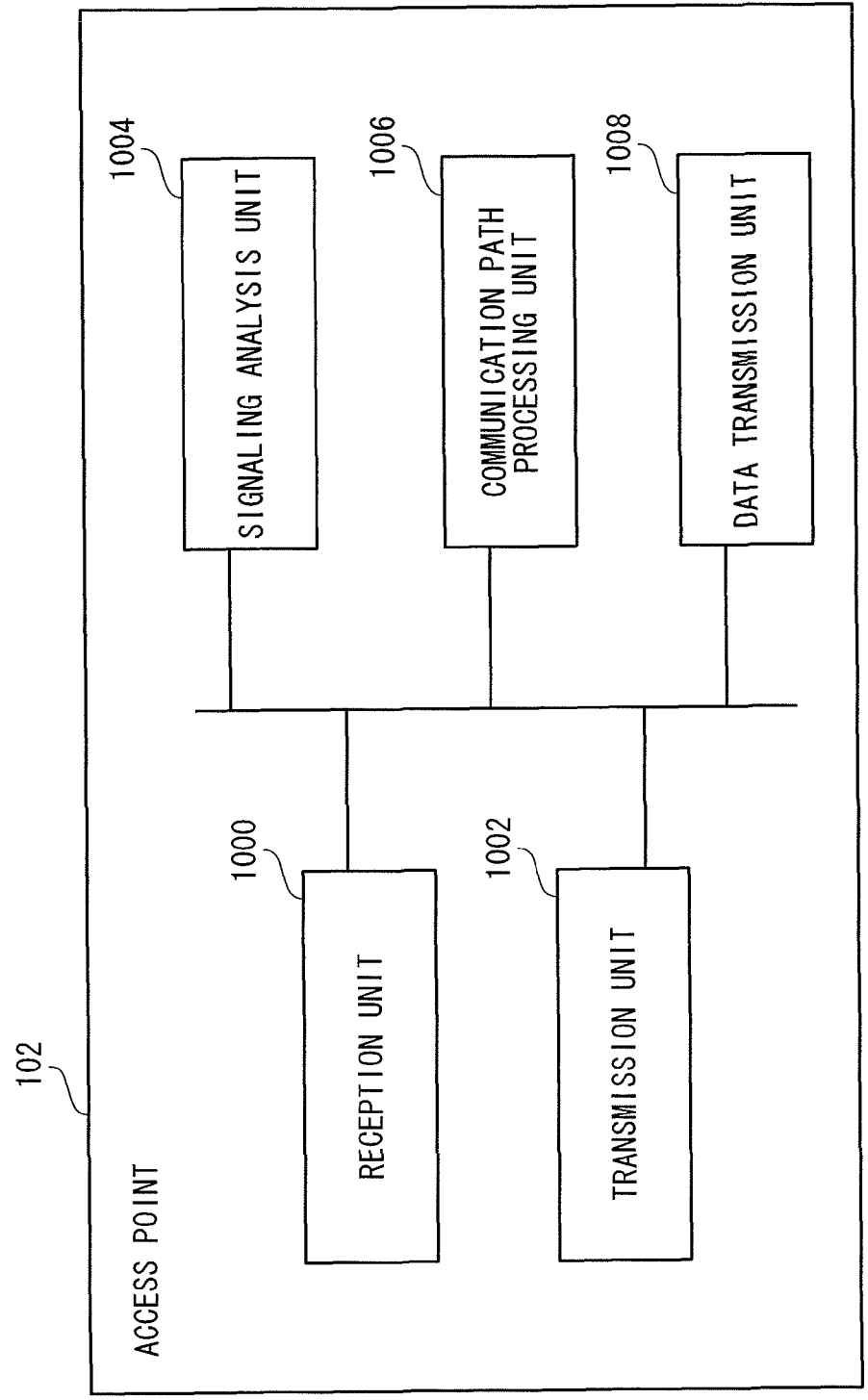
FIG. 8 is a block diagram illustrating an example of the configuration of an access point according to the second embodiment.

FIG. 8 is a block diagram illustrating an example of the configuration of the access point 102 according to the second embodiment. The access point 102 shown in FIG. 8 includes a reception unit 1000, a transmission unit 1002, a signaling analysis unit 1004, a communication path processing unit 1006, and a data transmission unit 1008. The reception unit 1000 receives a signaling. The transmission unit 1002 transmits a signaling. The signaling analysis unit 1004 analyzes the received signaling to confirm whether the signaling includes a parameter used to establish a handover communication path, that is, the signaling includes a parameter used to instruct the data transmitted along a given communication path as data transmitted along another communication path.

Hereinafter, an example of an operation of the signaling analysis unit 1004 of the HeNB 602 will be described based on the configuration of the network shown in FIG. 23 with reference to FIG. 7. The signaling analysis unit 1004 analyzes the bearer setup request transmitted from the MME 620 to confirm whether the bearer setup request includes the D-flag and the IDs of the two S1 bearers described above (step s1110).

When the bearer setup request includes these parameters, the communication path processing unit 1006 treats the data transmitted along the given communication path as the data transmitted along another communication path in accordance with the instruction analyzed by the signaling analysis unit 1004. An example of the communication path processing unit 1006 will be described with reference to FIGS. 23 and 7. The communication path processing unit 1006 establishes the RB 824 which can be bound originally only to the S1 bearer 826 and binds the S1 bearer 822 and the S1 bearer 826 included in the bearer setup request to the RB 824 (step s1112).

The data transmission unit 1008 is the same as the data transmission unit 308 of the access point 102 of the first embodiment.

Figure 7:
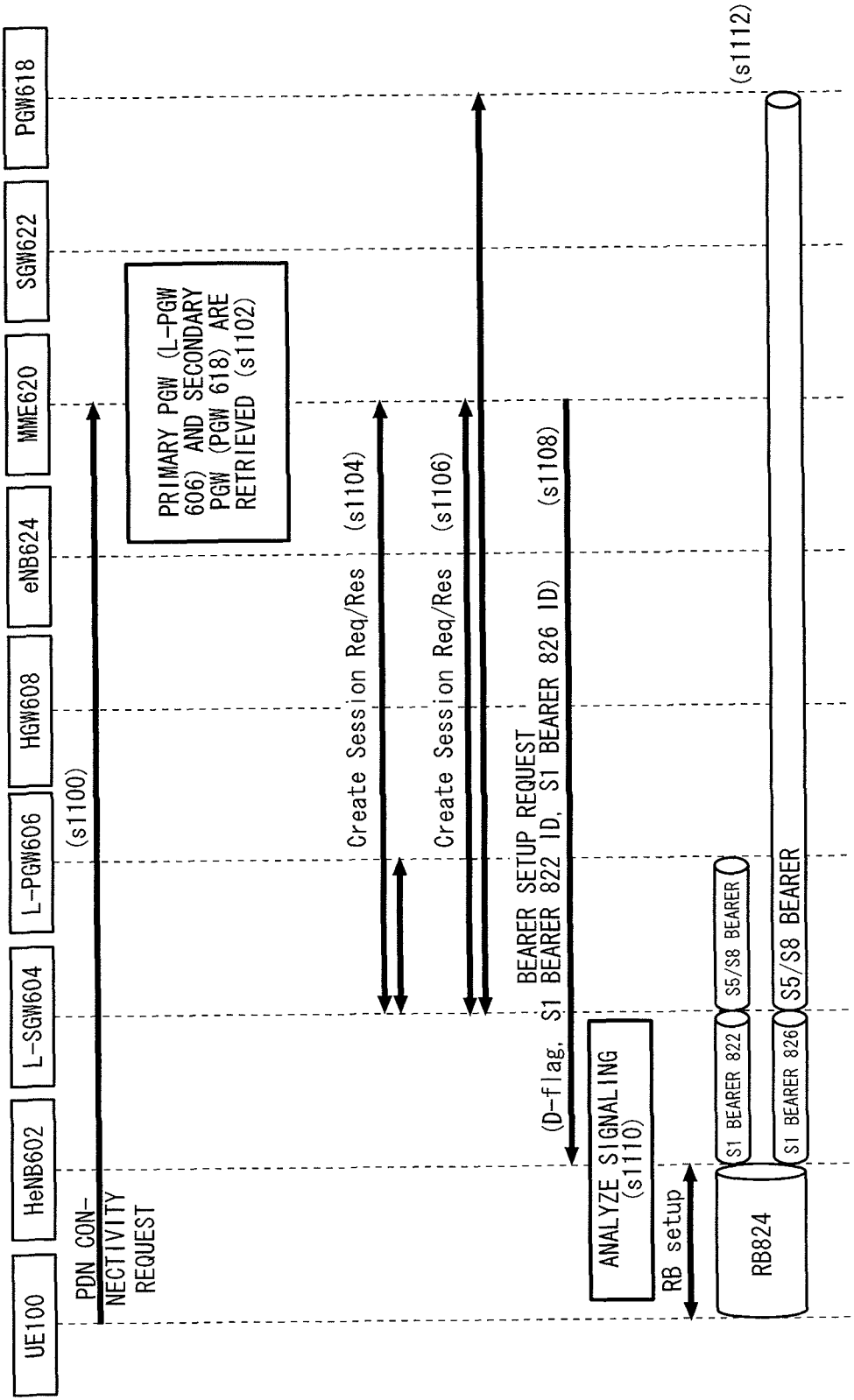
FIG. 7 is a sequence chart illustrating an example of a process signaling sequence according to the second embodiment.

In this embodiment, the PDN connectivity request (step s1100) in FIG. 7 may be an "Attach Request" described in NPL 1.

According to the embodiment of the invention, as described above, when the mobile terminal performs handover between the networks in which handover anchor points are different from each other, the data is not transmitted along a redundant path. Accordingly, it is possible to shorten the interruption time of data reception involved in handover of the mobile terminal. Further, it is possible to obtain the advantage without a change in the configuration of the mobile terminal.

Third Embodiment

A third embodiment of the invention will be described with reference to FIGS. 1, 9 to 13, and 23. According to the third embodiment, in the configuration of the network shown in FIG. 1, a handover communication path establishing request transmitted to the access point 102 is not transmitted from the mobile terminal 100, but is transmitted from the signaling processing node 108. The handover communication path establishing request is transmitted after the handover of the mobile terminal 100 is established.

Figure 9:
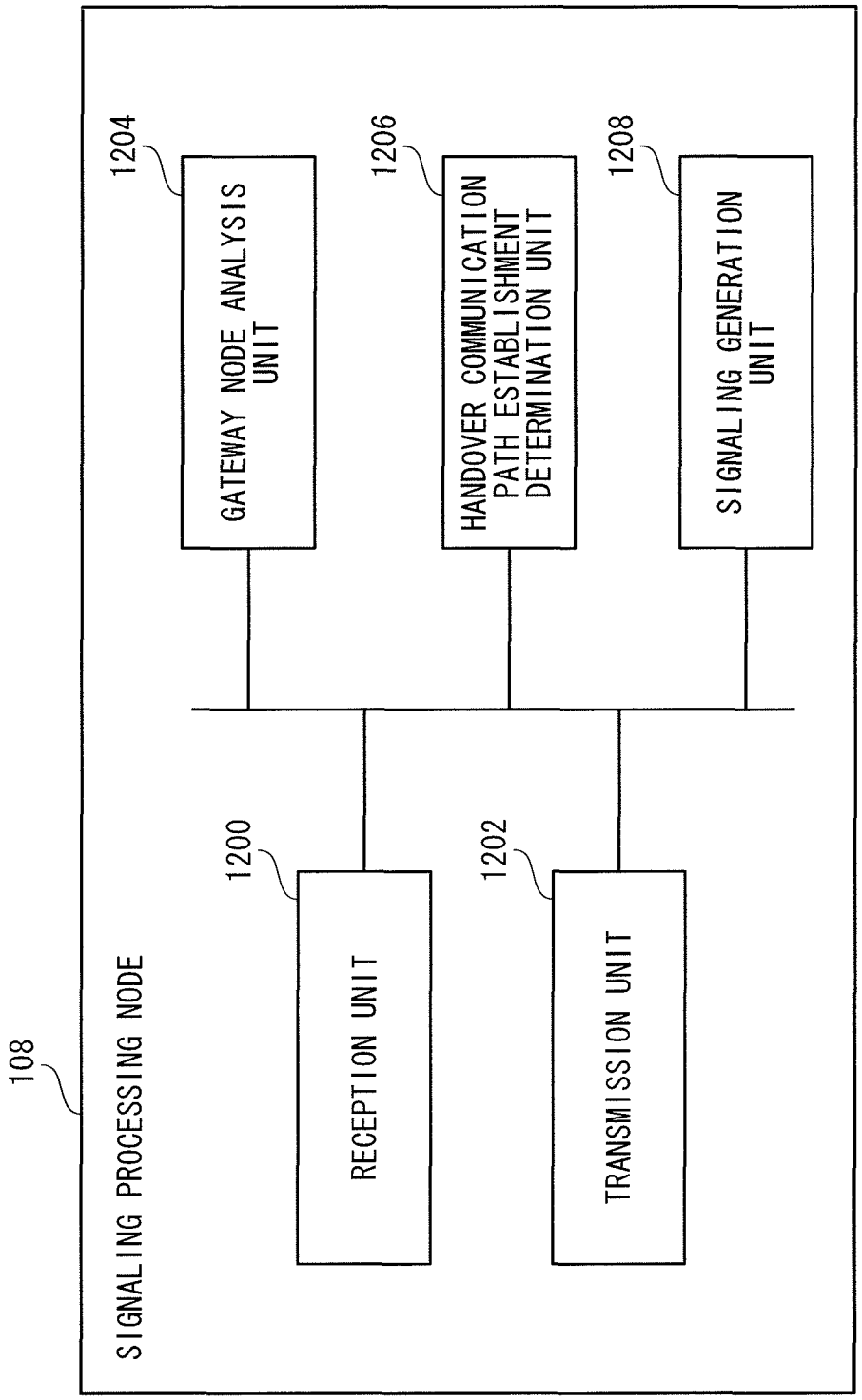
FIG. 9 is a block diagram illustrating an example of the configuration of a signaling processing node according to a third embodiment.

FIG. 9 is a block diagram illustrating an example of the configuration of the signaling processing node 108 according to the third embodiment. The signaling processing node 108 shown in FIG. 9 includes a reception unit 1200, a transmission unit 1202, a gateway node analysis unit 1204, a handover communication path establishment determination unit 1206, and a signaling generation unit 1208. The reception unit 1200 receives a signaling. The transmission unit 1202 transmits a signaling. The gateway node analysis unit 1204 is the same as the gateway node analysis unit 904 of the signaling processing node 108 of the second embodiment.

The handover communication path establishment determination unit 1206 determines the handover communication path, that is, the second communication path described in the first embodiment, after the mobile terminal 100 switches the connection destination from the access point 102 to the access point 110.

Hereinafter, an operation of the handover communication path establishment determination unit 1206 of the MME 620 will be described based on the configuration of the network shown in FIG. 23 with reference to FIG. 10. At the moment when the gateway node analysis unit 1204 analyzes the retrieved PGW and SGW, the handover of the UE 100 is not determined. Therefore, the handover communication path establishment determination unit 1206 determines that the bearer for the remote access (handover) is not established for the PGW 618 and establishes the bearer for the local access via the L-SGW 604 only for the L-PGW 606, as described in NPL 1. As a result, the RB 820 is established between the UE 100 and the HeNB 602 and the S1 bearer 822 is established between the HeNB 602 and the L-SGW 604.

Further, the S5/S8 bearer is established between the L-SGW 604 and the L-PGW 606 and the binding information of the communication path is retained in the HeNB 602 and the L-SGW 604 (step s1404 to step s1408). When the UE 100 determines the handover from the HeNB 602 to the eNB 624 and an "Handover Required" is transmitted from the HeNB 602 to the MME 620 (step s1410), the handover communication path establishment determination unit 1206 determines the establishment of the communication path for the handover (step s1412). As a result, the MME 620 transmits a signaling used to establish a bearer via the L-SGW 604 for the PGW 618 (step s1414).

Based on the characteristics of the gateway analyzed by the gateway node analysis unit 1204, the signaling generation unit 1208 generates a signaling used to instruct the access point 102 to process the data transmitted along the communication path passing through one of the retrieved gateway nodes as the data transmitted along the communication path passing through another gateway node of the retrieved gateway nodes. Further, the communication paths may have a one-to-one relationship or a plurality-to-plurality relationship.

Hereinafter, an example of an operation of the signaling generation unit 1208 of the MME 620 will be described based on the configuration of the network shown in FIG. 23 with reference to FIG. 10. The signaling generation unit 1208 sets the bearer setup request to be transmitted to the HeNB 602 such that the bearer setup request includes the ID of the S1 bearer 822. The signaling generation unit 1208 binds the S1 bearer 826 established for the handover to the RB 820 currently bound to the S1 bearer 822 and includes the D-flag indicating an instruction to treat the RB 820 as an RB for the handover originally binding the S1 bearer 826 in the bearer setup request (step s1416).

Figure 11:
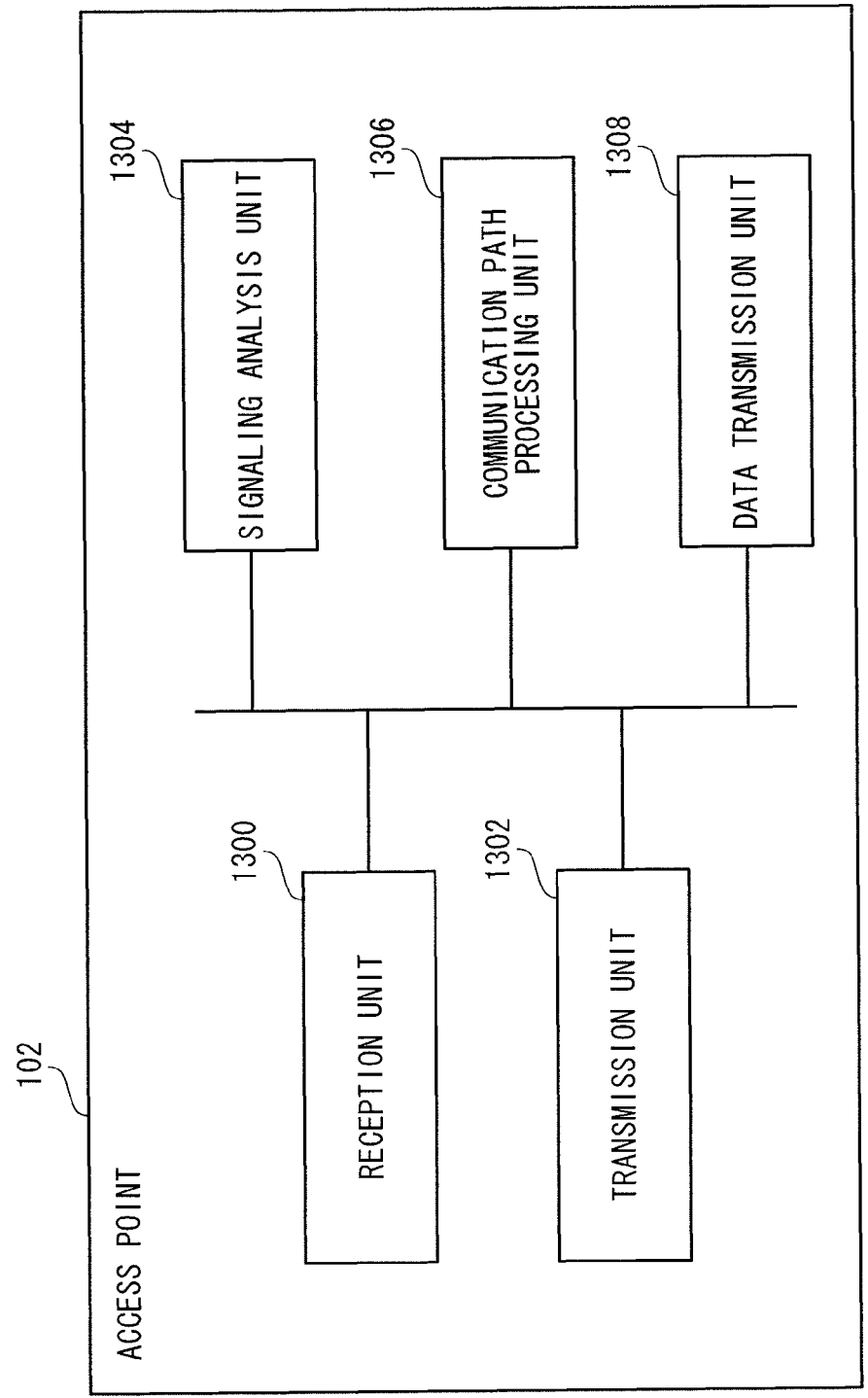
FIG. 11 is a block diagram illustrating an example of the configuration of an access point according to the third embodiment.

FIG. 11 is a block diagram illustrating an example of the configuration of the access point 102 according to the third embodiment. The access point 102 shown in FIG. 11 includes a reception unit 1300, a transmission unit 1302, a signaling analysis unit 1304, a communication path processing unit 1306, and a data transmission unit 1308. The reception unit 1300 receives a signaling. The transmission unit 1302 transmits a signaling. The signaling analysis unit 1304 analyzes the received signaling to confirm whether the signaling includes a parameter used to instruct the data transmitted along the communication path currently used by the mobile terminal 100 as the data transmitted along the communication path established by the signaling.

Hereinafter, an example of an operation of the signaling analysis unit 1304 of the HeNB 602 will be described based on the configuration of the network shown in FIG. 23 with reference to FIG. 10. The signaling analysis unit 1304 analyzes the bearer setup request transmitted from the MME 620 to confirm whether the bearer setup request includes the above-described D-flag and the above-described ID of the S1 bearer 822 currently used by the UE 100 (step s1418).

When the bearer setup request includes these parameters, the communication path processing unit 1306 treats the data transmitted along the communication path currently used by the mobile terminal 100 as the data transmitted along the communication path established by the signaling.

Hereinafter, an example of an operation of the communication path processing unit 1306 of the HeNB 602 will be described based on the configuration of the network shown in FIG. 23 with reference to FIG. 10. The communication path processing unit 1306 retrieves the ID of the RB 820 connectable to the S1 bearer 822 from the ID of the S1 bearer 822, which is included in the bearer setup request currently used by the UE 100, and binds the newly established S1 bearer 826 to the RB 820. Further, the communication path processing unit 1306 treats the RB 820 as the handover RB to which the S1 bearer 826 can be originally connected (step s1422). The data transmission unit 1308 is the same as the data transmission unit 308 of the access point 102 of the first embodiment.

Figure 10:
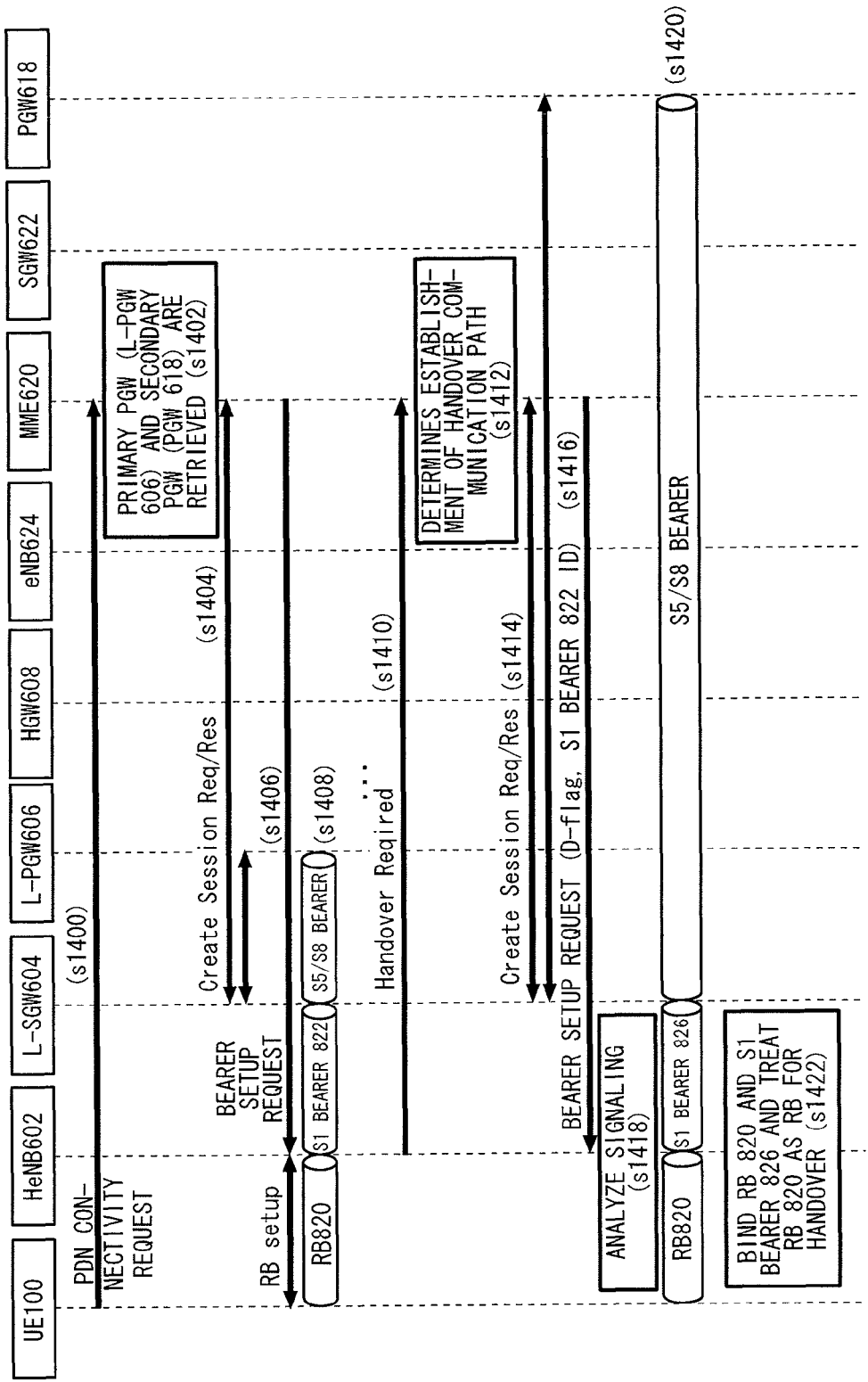
FIG. 10 is a sequence chart illustrating an example of a process signaling sequence according to the third embodiment.

In this embodiment, the PDN connectivity request (step s1400) in FIG. 10 may be an "Attach Request" described in NPL 1.

According to the embodiment of the invention, as described above, when the mobile terminal performs handover between the networks in which handover anchor points are different from each other, while avoiding the establishment of an unnecessary bearer, the data is not transmitted along a redundant path. Accordingly, it is possible to shorten the interruption time of data reception involved in handover of the mobile terminal. Further, it is possible to obtain the advantage without a change in the configuration of the mobile terminal.

Fourth Embodiment

A fourth embodiment of the invention will be described with reference to FIGS. 1, 12 to 15, and 23. In the fourth embodiment, a case will be described in which a UE 100 connected to an access point 110 and being performing data communication with a communication destination node 106 via a gateway node 112 and a network 114 switches a connection destination from the access point 110 to an access point 102 and communicates with the communication destination node 106 in the configuration of the network shown in FIG. 1. In the fourth embodiment, a second communication path passing through the access point 102 and the gateway node 104 is established simultaneously when the mobile terminal 100 switches the connection destination from the access point 110 to the access point 102 and a first communication path passing through the access point 102 and the gateway node 112 is established in a handover process with this switching. Further, the second communication path can be bound to the wireless section of the first communication path, that is, the path from the mobile terminal 100 to the access point 102.

Figure 12:
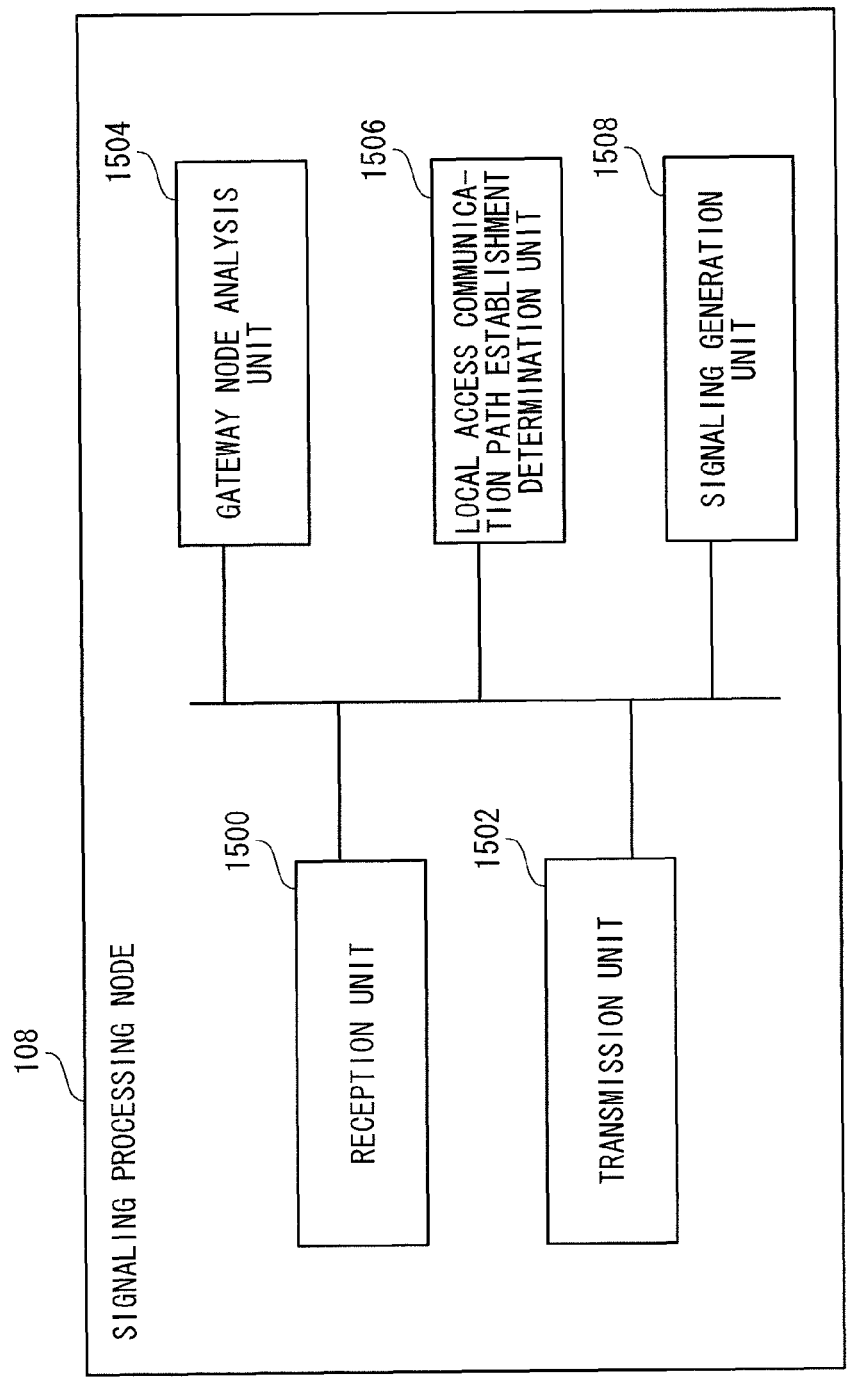
FIG. 12 is a block diagram illustrating an example of the configuration of a signaling processing node according to a fourth embodiment.

FIG. 12 is a block diagram illustrating an example of the configuration of the signaling processing node 108 according to the fourth embodiment. The signaling processing node 108 shown in FIG. 12 includes a reception unit 1500, a transmission unit 1502, a gateway node analysis unit 1504, a local access communication path establishment determination unit 1506, and a signaling generation unit 1508. The reception unit 1500 receives a signaling. The transmission unit 1502 transmit a signaling. When the gateway node analysis unit 1504 retrieves a gateway node of a communication path establishment destination in response to a communication path establishing request from the mobile terminal 100 and consequently retrieves a plurality of gateway nodes, the gateway node analysis unit 1504 analyzes the characteristics of the retrieved gateway nodes.

Hereinafter, an example of an operation of the gateway node analysis unit 1504 of the MME 620 will be described based on the configuration of the network shown in FIG. 23 with reference to FIG. 13. To start data communication with the communication destination node 612 via the eNB 624, PGW 618, the network 616, and the HGW 608, the UE 100 transmits the PDN connectivity request to the MME 620 (step s1800). When the MME 620 receives the PDN connectivity request, as described in NPL 1, the MME 620 retrieves a connection destination PGW and an SGW serving as a relay node based on connection destination APN included in the signaling. At this time, the PGW 618 is retrieved as a primary PGW and the L-PGW 606 is retrieved as a secondary PGW (step s1802).

Based on the retrieval result, the MME 620 determines that the primary PGW (PGW 618) is the PGW for which the UE 100 currently gives a connection request to perform the data communication with the home network 614 in a remote access manner, and determines that the secondary PGW (L-PGW 606) is the PGW to which the UE 100 is connected by switching the connection destination to the HeNB 602 to perform the data communication with the home network 614 in the local access manner. Further, as a reference used for the MME 620 to perform the determination, for example, a parameter indicating the PGW for the home network communication (remote access) explicitly from the eNB may be used, a parameter indicating the PGW for the home network communication (local access) from the H eNB may be used, or the IP address of the gateway node may be used.

When the mobile terminal 100 switches the connection destination from the access point 110 to the access point 102, the local access communication path establishment determination unit 1506 determines that the access point 102 is an optimum path reaching the communication destination node 106, that is, the access point 102 is an access point that can establish the communication path passing through the access point 102 and the gateway node 104. Then, the local access communication path establishment determination unit 1506 determines that the optimum path is established, after the mobile terminal 100 determines to switch the connection destination from the access point 110 to the access point 102.

Hereinafter, an example of an operation of the local access communication path establishment determination unit 1506 of the MME 620 will be described based on the configuration of the network shown in FIG. 23 with reference to FIGS. 13 and 14. At the moment when the gateway node analysis unit 1504 analyzes the retrieved PGW, the handover of the UE 100 is not determined. Therefore, the local access communication path establishment determination unit 1506 determines that the bearer is not established for the L-PGW 606 and establishes the bearer via the SGW 622 only for the PGW 618, as described in NPL 1. As a result, the RB 1702 is established between the UE 100 and the eNB 624 and the S1 bearer 1700 is established between the eNB 624 and the SGW 622. Further, the S5/S8 bearer is also established between the PGW 618 and the SGW 622. The binding information of the communication path is retained in each of the eNB 624 and the SGW 622 (step s1804 to step s1806).

Thereafter, a session (a session or the like formed using the above-described SIP) for the remote access is established between the UE 100 and the HGW 608 via the bearer established in step s1806 (step s1808). Next, when the UE 100 determines the handover from the eNB 624 to the HeNB 602 and an "Handover Required" is transmitted from the eNB 624 to the MME 620 (step s1810), the local access communication path establishment determination unit 1506 determines that an eNB as a handover destination is the HeNB 602 with which the UE 100 can perform the data communication via the HGW 608 and the L-PGW 606 (in the local access manner) based on the information regarding the ID of the eNB as the handover destination described in NPL 1 or information such as CSG (Closed Subscriber Group), and determines the establishment of the communication path for the local access (step s1812). As a result, the MME 620 transmits a signaling used to establish a bearer to the L-PGW 606 via the L-SGW 604 (step s1814).

The signaling generation unit 1508 generates a signaling used to instruct the access point 102 to perform a process of sharing the communication path passing through the gateway node 112, the access point 102, and the mobile terminal 100 with a part of the communication path passing through the gateway node 104, the access point 102, and the mobile terminal 100 in order to establish the above-described optimum path early. Further, the communication paths may have a one-to-one relationship or a plurality-to-plurality relationship.

Hereinafter, an example of an operation of the signaling generation unit 1508 of the MME 620 will be described based on the configuration of the network shown in FIG. 23 with reference to FIGS. 13 and 14. The signaling generation unit 1508 sets the "Handover Request" transmitted from the MME 620 to the HeNB 602 as a normal handover process described in NPL 1 such that "Handover Request" includes an S1 bearer 1706 established for the local access and a D-flag that means an instruction to bind the S1 bearer 1706 to an RB 1708 bound to the S1 bearer 1704 established in the normal handover process and to treat the RB 1708 as a communication path for the local access, that is, a part of a communication path passing through the UE 100, the HeNB 602, the L-SGW 604, and the L-PGW 606 (step s1816).

Figure 15:
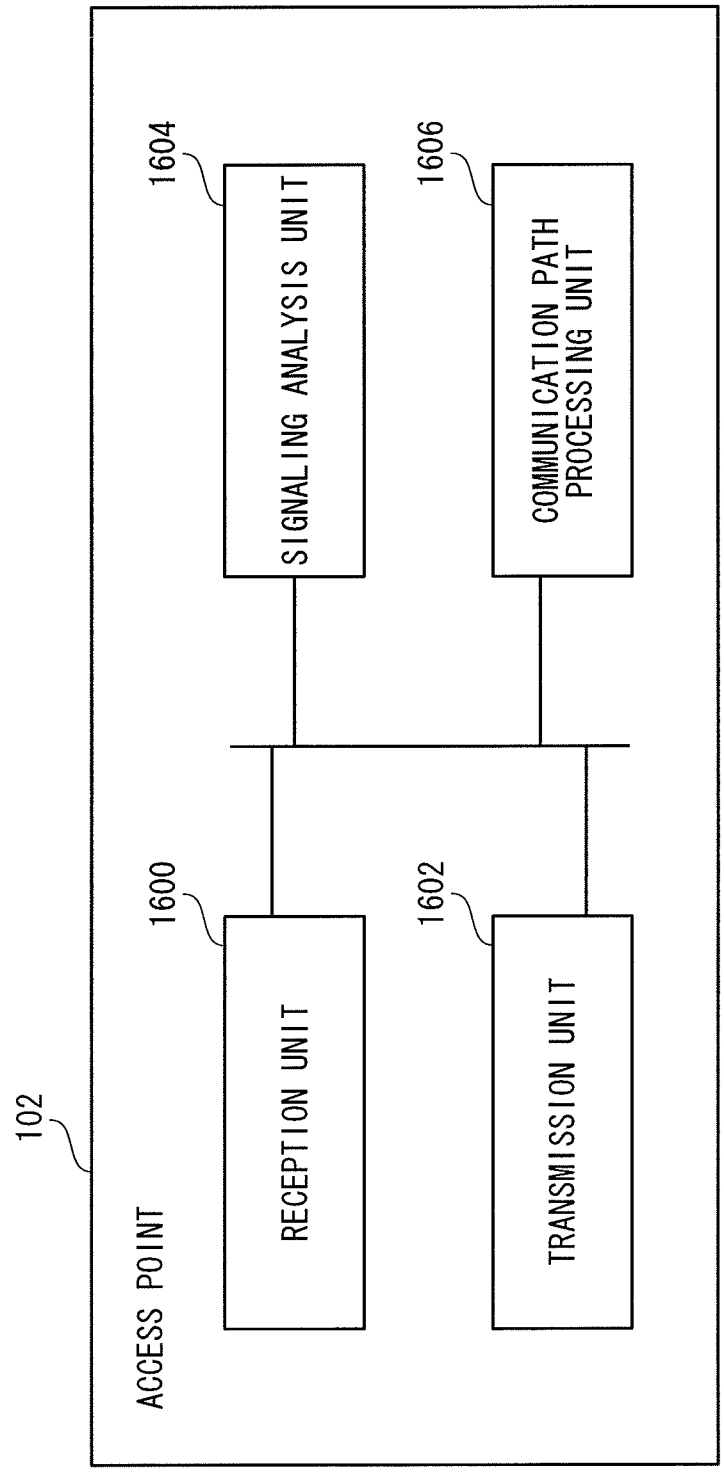
FIG. 15 is a block diagram illustrating an example of the configuration of an access point according to the fourth embodiment.

FIG. 15 is a block diagram illustrating an example of the configuration of the access point 102 according to the fourth embodiment. The access point 102 shown in FIG. 15 includes a reception unit 1600, a transmission unit 1602, a signaling analysis unit 1604, and a communication path processing unit 1606. The reception unit 1600 receives a signaling. The transmission unit 1602 transmits a signaling. The signaling analysis unit 1604 analyzes the received signaling to confirm whether the signaling includes a parameter used to give an instruction to share the communication path passing the gateway node 112, the access point 102, and the mobile terminal 100 with the part of the communication path passing through the gateway node 104, the access point 102, and the mobile terminal 100 in order to establish the optimum path early.

Hereinafter, an example of an operation of the signaling analysis unit 1604 of the HeNB 602 will be described based on the configuration of the network shown in FIG. 23 with reference to FIGS. 13 and 14. The signaling analysis unit 1604 analyzes the "Handover Request" transmitted from the MME 620 to confirm whether the "Handover Request" includes the D-flag and the ID of the S1 bearer 1706 for the local access described above (step s1818).

When the "Handover Request" includes these parameters, the communication path processing unit 1606 performs the process of sharing the communication path passing through the gateway node 112, the access point 102, and the mobile terminal 100 with the part of the communication path passing through the gateway node 104, the access point 102, and the mobile terminal 100.

Hereinafter, an example of an operation of the communication path processing unit 1606 of the HeNB 602 will be described based on the configuration of the network shown in FIG. 23 with reference to FIGS. 13 and 14. The communication path processing unit 1606 binds the S1 bearer 1706 for the local access included in the "Handover Request" to the RB 1708 established so as to correspond to the S1 bearer 1704 established through a normal handover process and treats the RB 1708 as a part of a communication path for the local access, that is, a communication path passing through the UE 100, the HeNB 602, the L-SGW 604, and the L-PGW 606 (step s1820 to step s1826).

Figure 13:
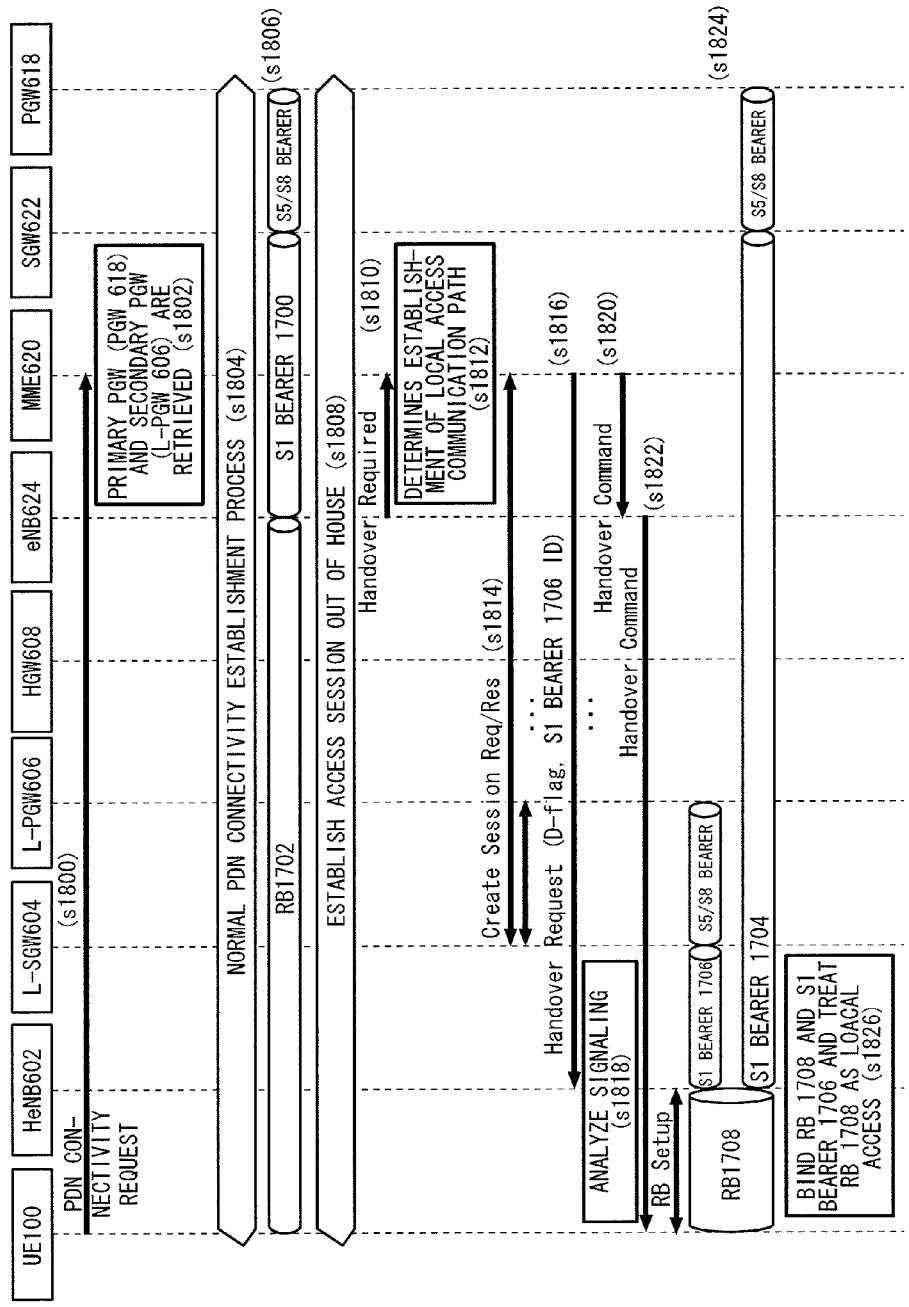
FIG. 13 is a sequence chart illustrating an example of a process signaling sequence according to the fourth embodiment.
Figure 14B:
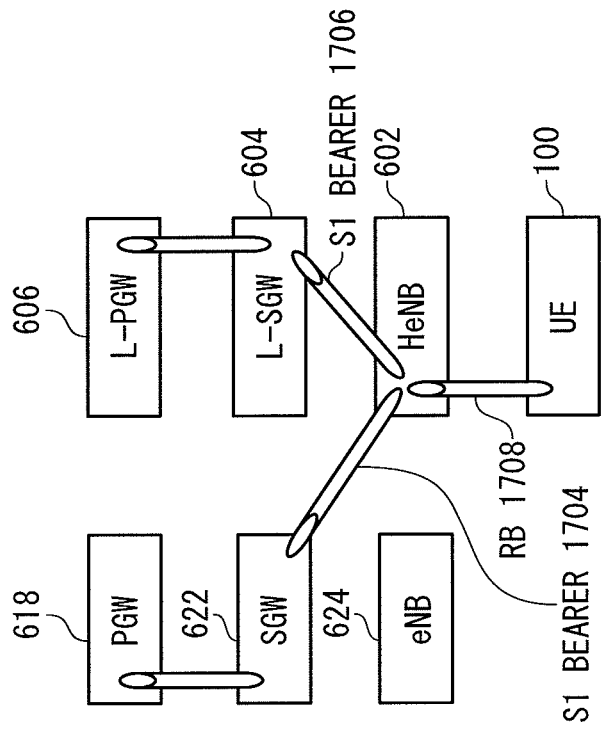
FIG. 14A is a diagram illustrating an example of binding of a bearer before handover and FIG. 14B is a diagram illustrating an example of the binding of the bearer after the handover.
Figure 14A:
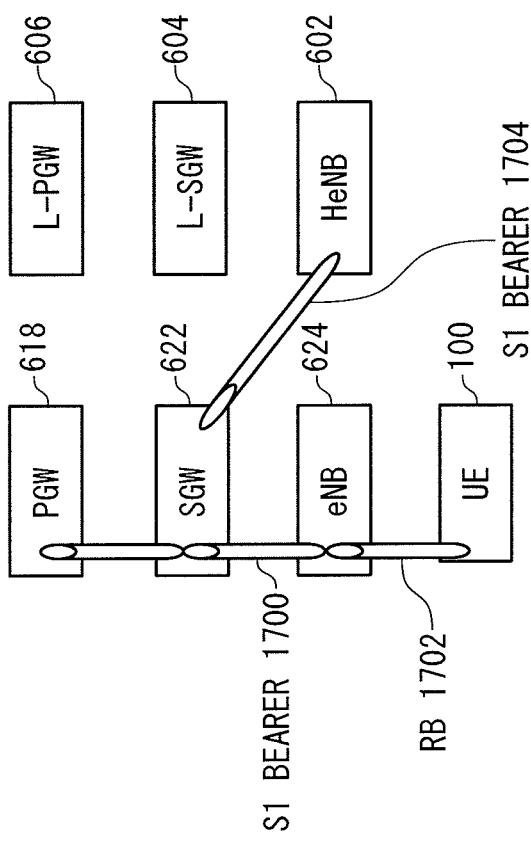

In this embodiment, the PDN connectivity request (step s1800) in FIG. 13 may be "Attach Request" described in NPL 1.

In the embodiment of the invention, as described above, when the mobile terminal performs the handover between the networks in which the handover anchor points are different from each other and the handover anchor point for which the handover destination access point is a local anchor point can be used, the mobile terminal is connected to a movement destination access point, and then can immediately use the local access communication path.

In the first to fourth embodiments, continuity of the data communication regarding the change in a gateway node, for example, the change in an IP address involved in the change from the L-PGW 606 to the PGW 618 is assumed to be resolved, for example, by registering an IP address in the data communication performed via the L-PGW 606 as a home address (HoA) and registering an IP address in the data communication performed via the PGW 618 as a care-of-address (CoA), for example, when the home gateway 608 has the Home Agent function described in NPL 4 or 5.

In the first to fourth embodiments, when two S1 bearers are bound to one RB, only the downlink may be bound. Thus, a signaling or data of an uplink is transmitted to an appropriate S1 bearer. In the first to third embodiments, by causing an S1 bearer and an RB to have a one-to-one relationship, as described in NPL 1, without binding two S1 bearers to one RB, the HeNB 602 may have only the function of transmitting the data transmitted from the S1 bearer for the local access to the eNB 624 via a transmission tunnel formed for handover.

Fifth Embodiment

A fifth embodiment will be described with reference to FIGS. 1, 16 to 20, and 23. In the fifth embodiment, while the UE 100 connected to the access point 102 in the configuration of the network shown in FIG. 1, the UE 100 is connected to the communication destination node 106 via the gateway node 112 in advance and switches to data communication using the communication path.

Figure 16:
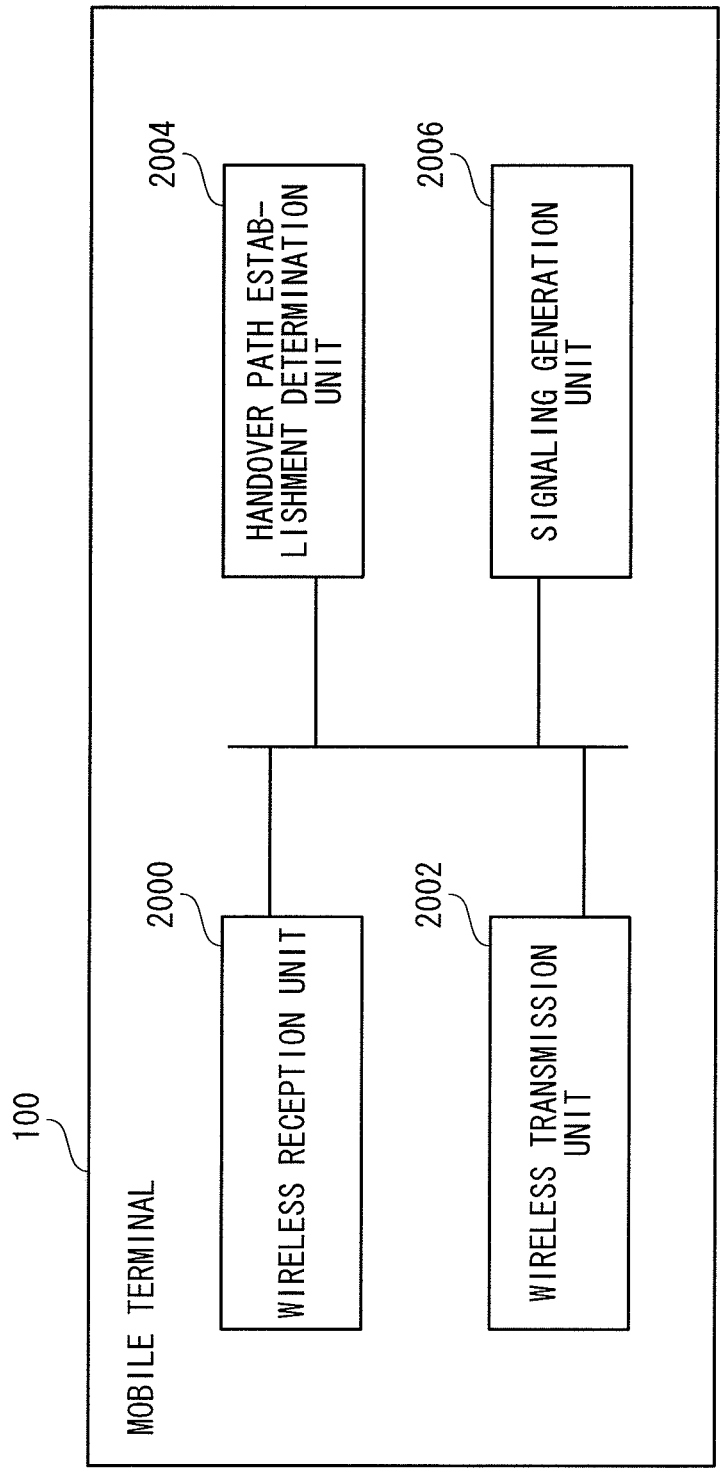
FIG. 16 is a block diagram illustrating an example of the configuration of a mobile terminal according to a fifth embodiment.

FIG. 16 is a block diagram illustrating an example of the configuration of the mobile terminal 100 according to the fifth embodiment. As shown in FIG. 16, the mobile terminal 100 includes a wireless reception unit 2000, a wireless transmission unit 2002, a handover path establishment determination unit 2004, and a signaling generation unit 2006. The wireless reception unit 2000 receives a radio signaling. The wireless transmission unit 2002 transmits a radio signaling. When the mobile terminal 100 switches the connection to an access point (for example, the access point 110) in the neighborhood of the mobile terminal 100, the handover path establishment determination unit 2004 detects that a gateway node (for example, the gateway node 104) through which the currently used communication path passes is not available, and establishes a handover communication path passing through the gateway node (for example, the gateway node 112) also available in a connection switching destination.

Figure 17:
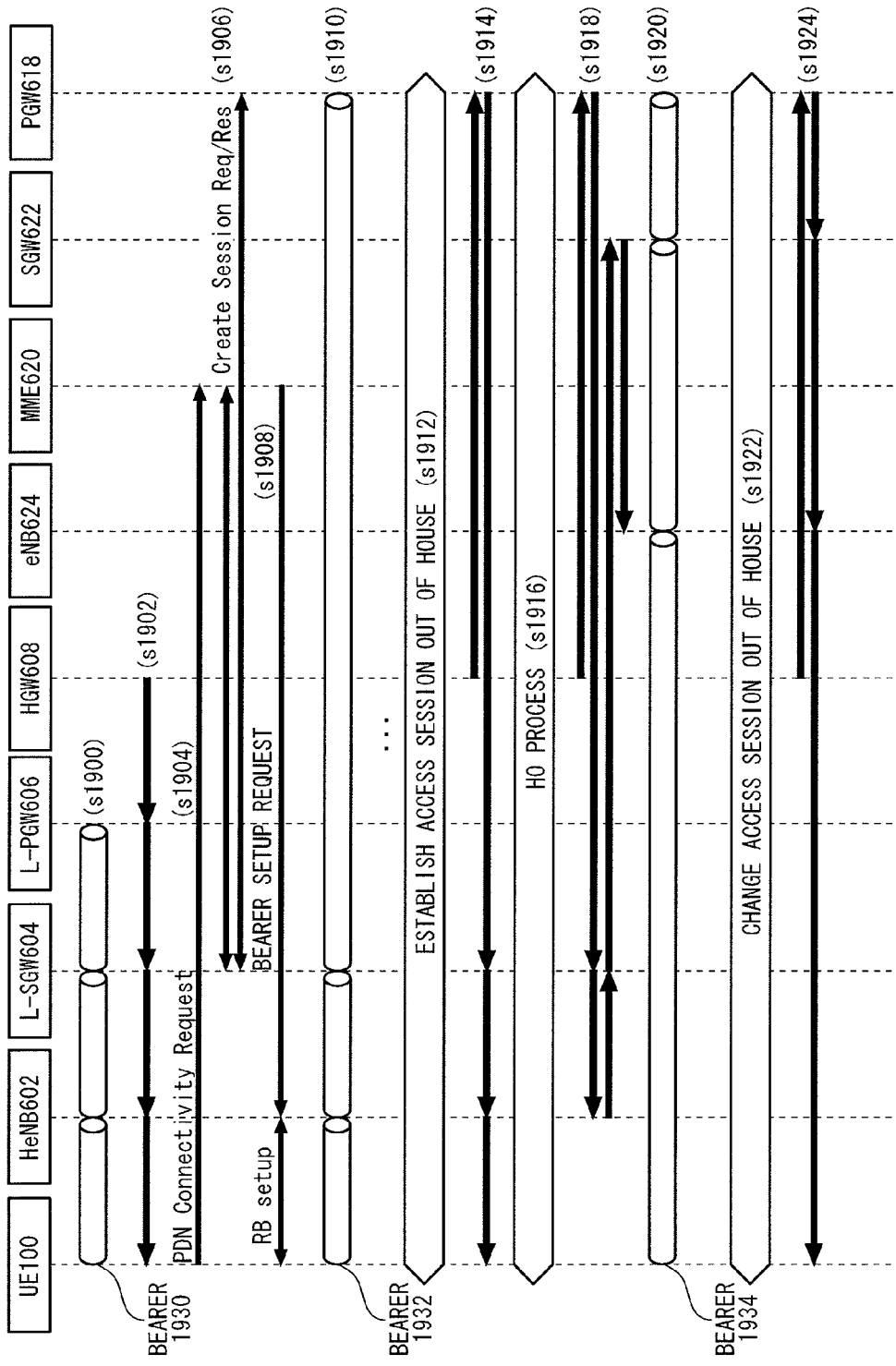
FIG. 17 is a sequence chart illustrating an example of a process signaling sequence according to the fifth embodiment.

Hereinafter, an example of an operation of the handover path establishment determination unit 2004 of the UE 100 will be described based on the configuration of the network shown in FIG. 23 with reference to FIG. 17. Currently, the UE 100 is wirelessly connected to the HeNB 602 and is performing data communication with the communication destination node 612 via the L-SGW 604 and the L-PGW 606, that is, is performing data communication using the bearer 1930. That is, the UE 100 is performing the data communication in a local access manner. The data communication may be performed via the home gateway (HGW) 608 (step s1900 and step s1902).

When the mobile terminal 100 is connected to the HeNB 602, the handover path establishment determination unit 2004 recognizes that the above-described bearer is bound between a CSG ID (Closed Subscriber Group IDentifier) or a connection destination APN (Access Point Name) disclosed in NPL 1 to the L-PGW 606 and the communication path is thus established. Then, before the connection is switched from the HeNB 602 to the eNB 624 (the handover is performed), the handover path establishment determination unit 2004 determines a communication path between the communication destination node 612 of a subordinate of the eNB 624 and the PGW 618 enabling the data communication, that is, determines the establishment of a remote access communication path.

Figure 18:
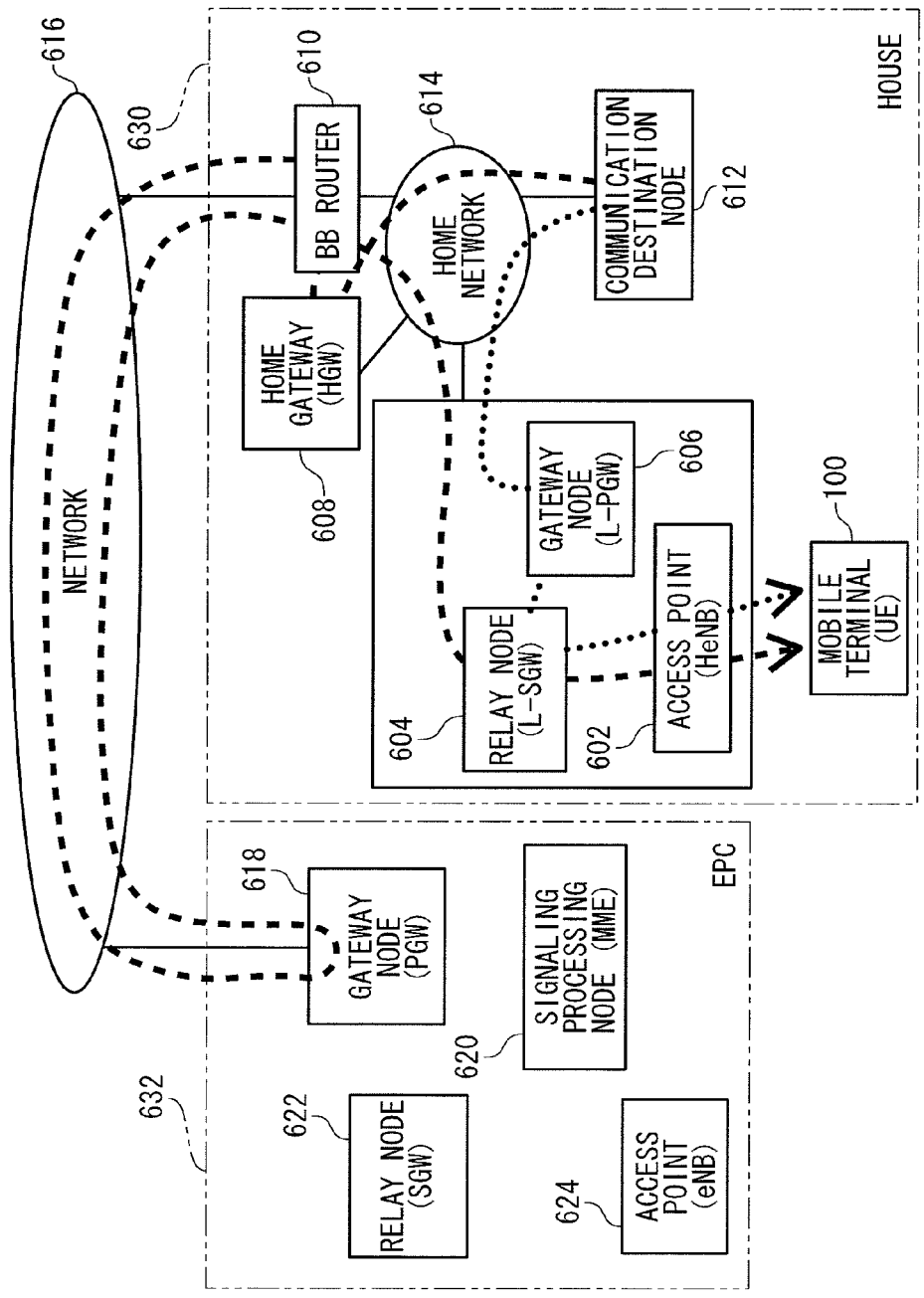
FIG. 18 is a diagram illustrating a session before handover of a mobile terminal in a method of establishing a communication path for remote access in advance when the mobile terminal performs the handover.
Figure 19:
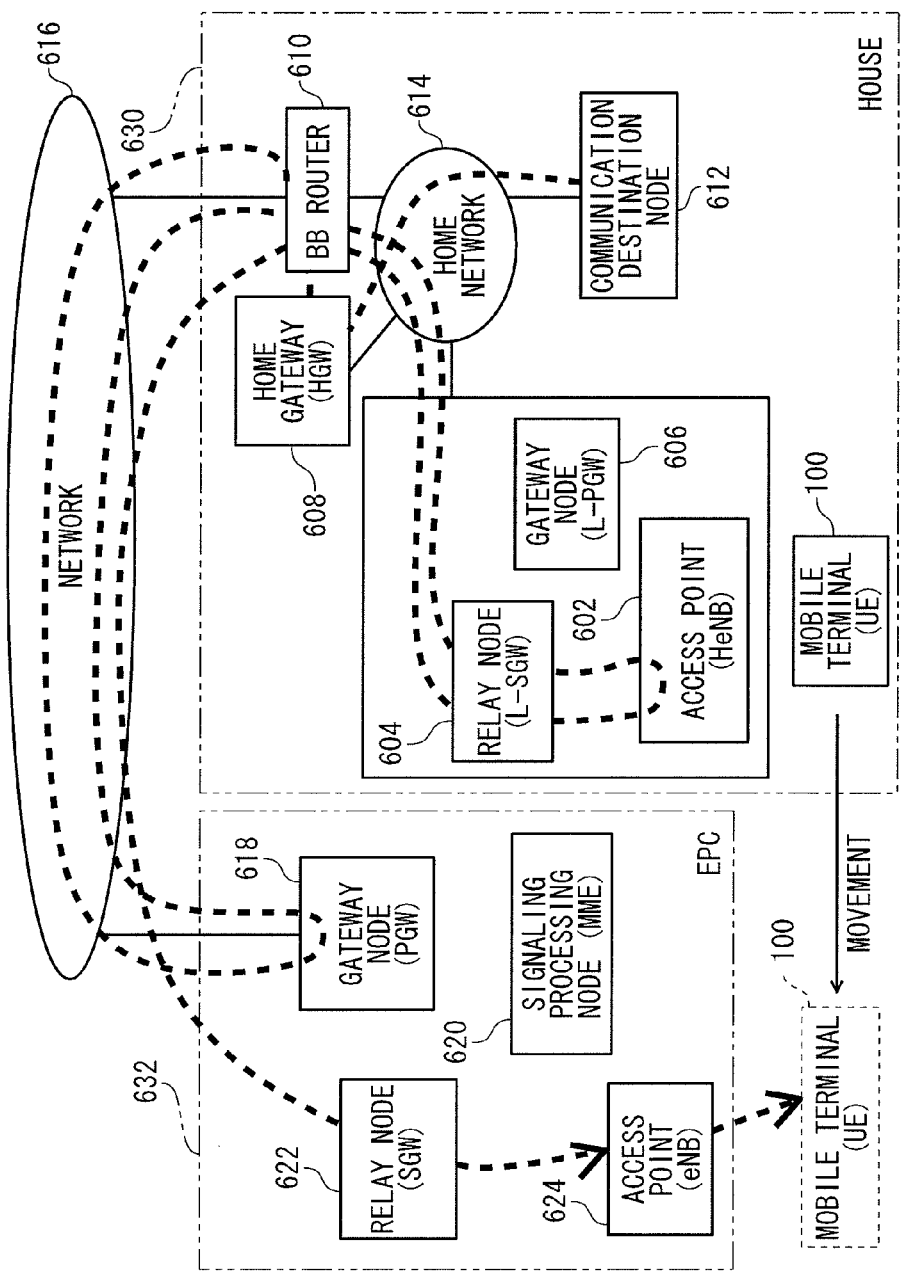
FIG. 19 is a diagram illustrating a session during the handover of the mobile terminal in the method of establishing the communication path for remote access in advance when the mobile terminal performs the handover.
Figure 20:
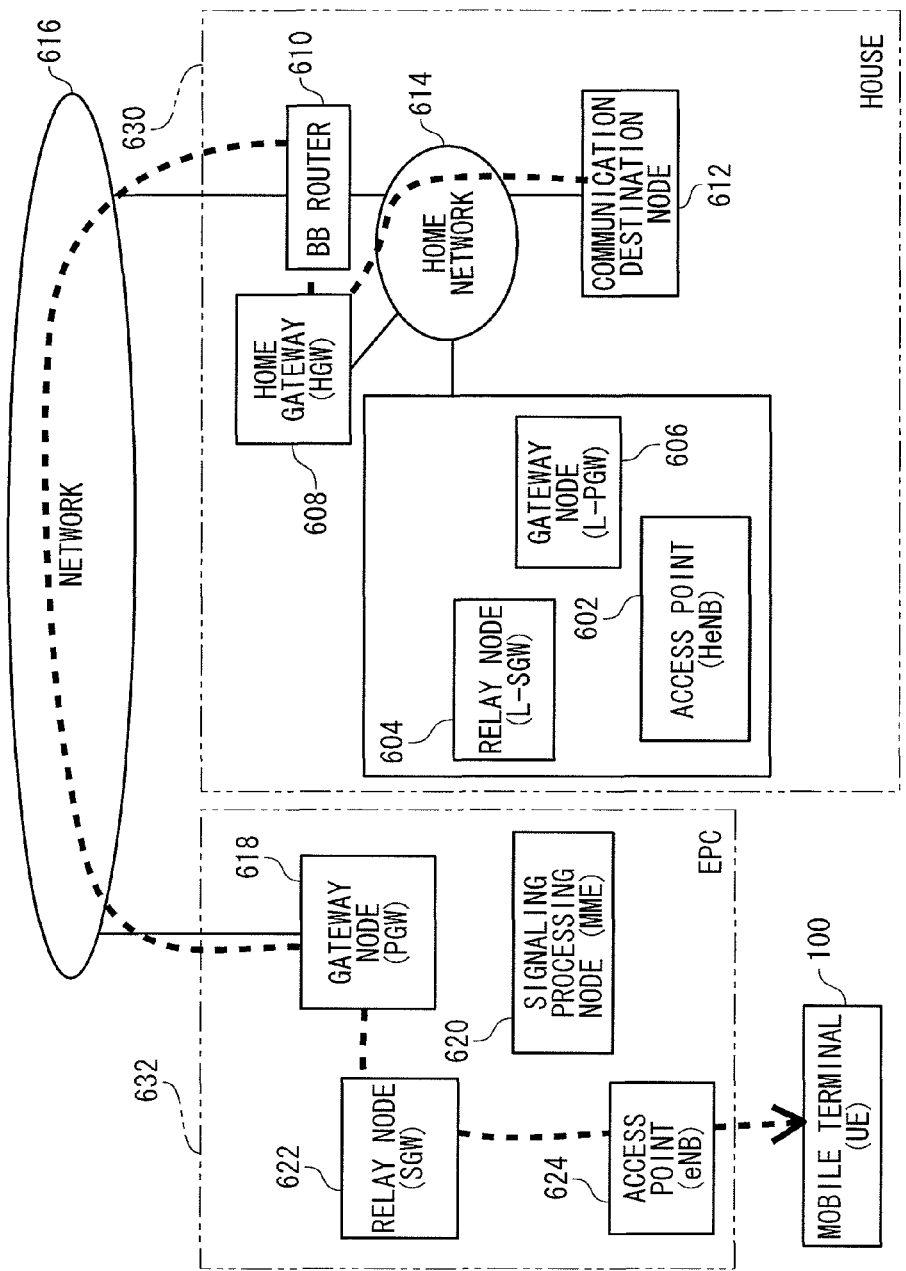
FIG. 20 is a diagram illustrating a session after the handover of the mobile terminal in the method of establishing the communication path for remote access in advance when the mobile terminal performs the handover.
Figure 21:
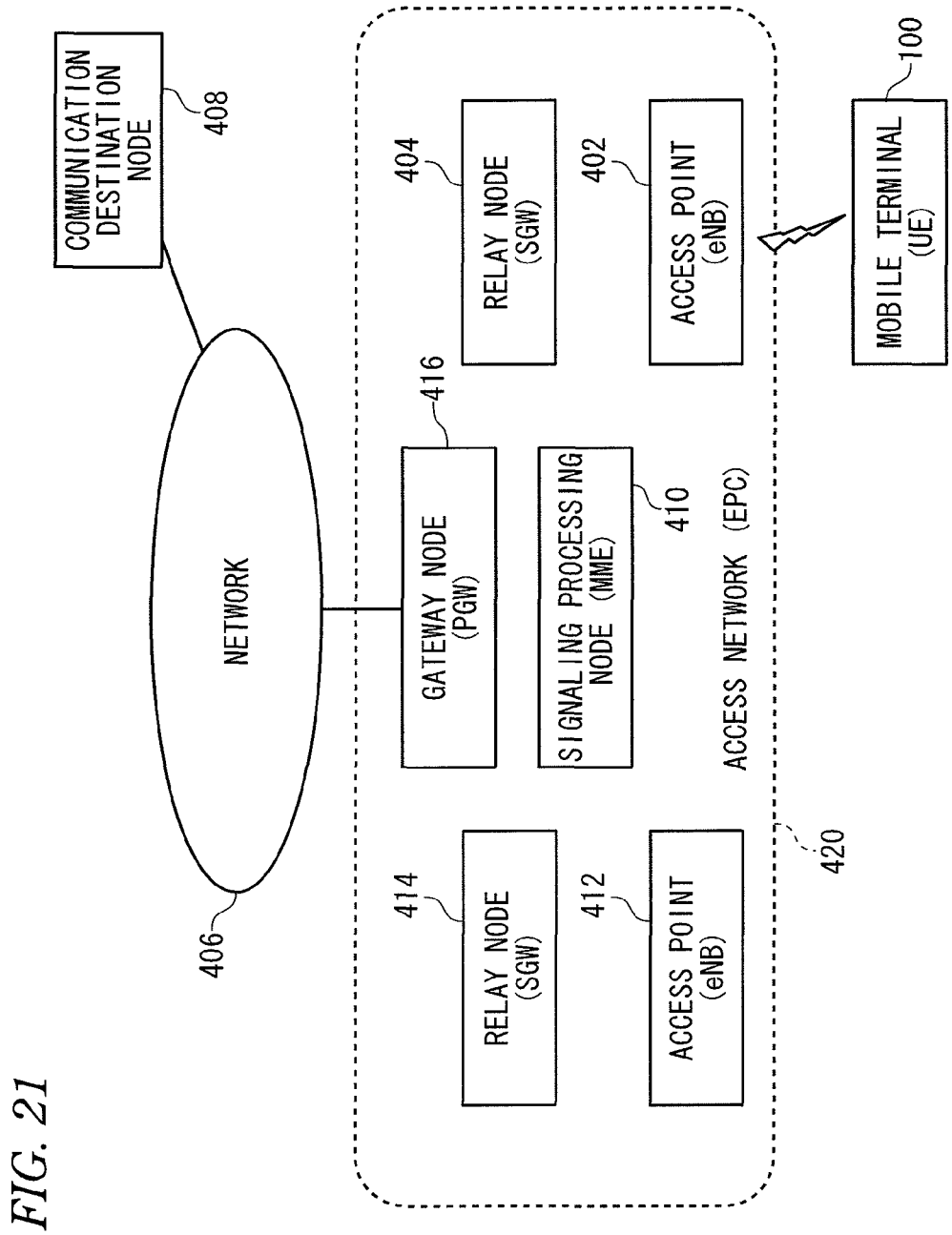
FIG. 21 is a diagram illustrating a part of the configuration of a network according to NPL 1.
Figure 22:
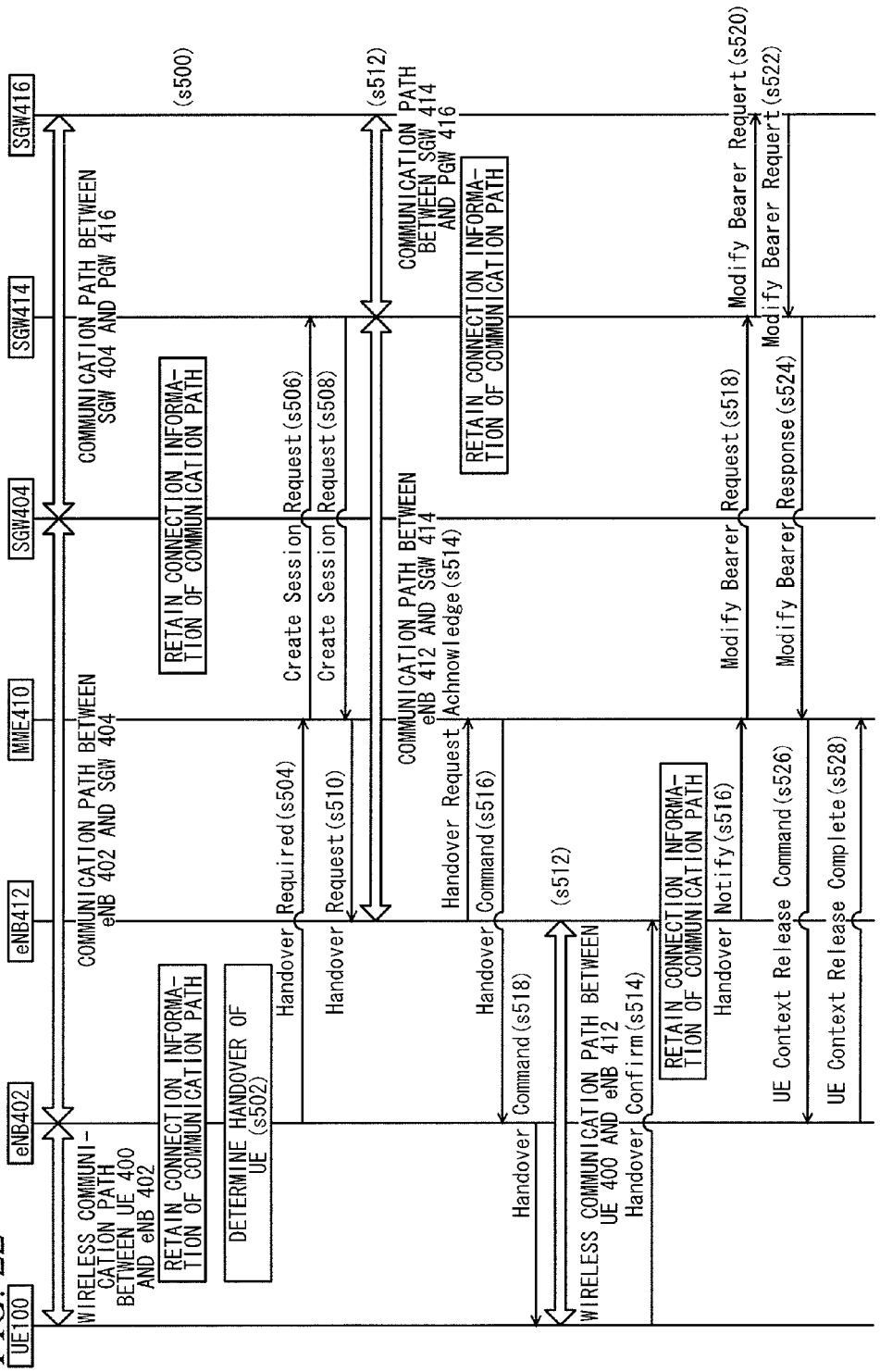
FIG. 22 is a sequence chart illustrating an example of a handover signaling sequence of a 3GPP SAE system according to a related art.

FIGS. 18 to 20 are diagrams illustrating a method of establishing the remote access communication path in advance when the mobile terminal 100 performs the handover. FIG. 18 shows a session before the handover. FIG. 19 shows a session during the handover. FIG. 20 shows a session after the handover. In the method of establishing the remote access communication path by switching the gateway node in advance when the mobile terminal 100 performs the handover according to this embodiment shown in the drawings, data is transmitted from the communication destination node 612 to the mobile terminal 100 along a communication path passing through the BB router 610, the network 616, and the PGW 618 of the EPC 632, as in FIG. 18, even when the mobile terminal 100 is located at the house 630. Further, in this method, the data transmitted from the communication destination node 612 is accumulated in the eNB 624, while the mobile terminal 100 performs the handover.

The signaling generation unit 2006 generates a signaling used to establish the remote access communication path.

Hereinafter, an example of an operation of the signaling generation unit 206 of the UE 100 will be described based on the configuration of the network shown in FIG. 23 with reference to FIG. 17. When a handover communication path is established with the PGW 618, the UE 100 connected to the HeNB 602 generates a PDN connectivity request, as described in NPL 1. When the MME 620 receives the PDN connectivity request, as described in NPL 1, the MME 620 retrieves the connection destination PGW and the SGW serving as a relay node based on the connection destination APN included in the signaling and transmits the signaling to establish the S1 bearer and the S5/S8 bearer (step s1906). When the MME 620 transmits a bearer setup request to the HeNB 602 and the RB is established between the HeNB 602 and the UE 100, a remote access communication path (bearer 1932) is established between UE 100 and the PGW 618 (step s1904 to step s1910).

When the bearer 1932 is established, the signaling generation unit 2006 generates a signaling used to establish an access session out of the house in order to immediately perform the data communication with the communication destination node 612 along the bearer 1932. When the signaling is transmitted and processed, the access session out of the house is established between the UE 100 and the HGW 608 along the bearer 1932 (step s1912), and the UE 100 performs the data communication with the communication destination node 612 via the access session out of the house (step s1914).

When it is determined that the connection destination of the UE 100 is switched from the HeNB 602 to the eNB 624, as described in NPL 1, the handover of the UE 100 is processed. Thus, the data transmitted from the communication destination node 612 to the HeNB 602 via the access session output the house is transmitted to the eNB 624 (step s1918). When the UE 100 is connected to the eNB 624, the bearer 1934 is established among the UE 100, the eNB 624, the SGW 622, and the PGW 618. When the bearer 1934 is established, the access session out of the house is also changed so as to pass through the bearer 1934 (step s1922). Thus, the data communication between the UE 100 and the communication destination node 612 is changed so as to pass through the bearer 1934 (step s1924).

In the embodiment of the invention, as described above, the interruption time of the data reception involved in the handover of the mobile terminal can be shortened, when the mobile terminal performs the handover between the networks in which the handover anchor points are different from each other.

Sixth Embodiment

A sixth embodiment of the invention will be described with reference to FIGS. 1 and 25 to 29. In the sixth embodiment, a case in which a communication destination node of the mobile terminal (UE) is a mobile terminal (UE) and both the mobile terminals perform bi-directional communication such as voice calling will be described as a use case.

Figure 25:
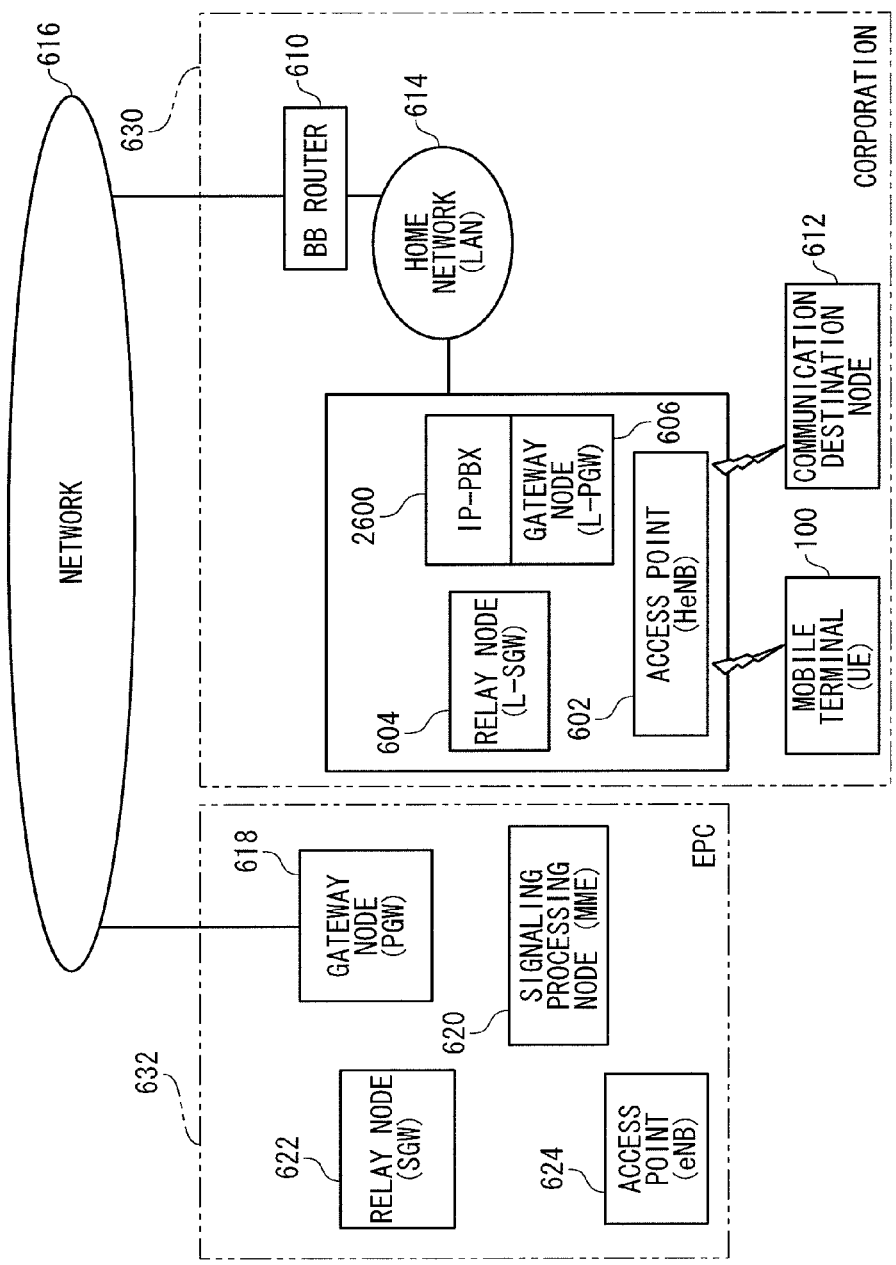
FIG. 25 is a diagram illustrating an example of a relation between an EPC and a corporation network including a corporation HeNB 602 in a corporation to which the UE 100 and a UE 612 can be connected wirelessly (local access).

FIG. 25 is a diagram illustrating an example of a relation between an EPC and a corporation network to which the UE 100 and the UE 612 can be wireless connected and which includes an HeNB 602 capable of performing wireless connection (local access) in a corporation. An IP-PBX (Internet Protocol Private Branch eXchange) 2600 in a corporation 630 shown in FIG. 25 is a device and software that are used generally to realize an in-house telephone network for IP telephony in a LAN of an organization such as a firm. In this embodiment, since the IP-PBX 2600 realizes an in-house telephone network for the IP telephony using the HeNB 602, an interface is provided between the IP-PBX 2600 and the L-PGW 606. The other nodes shown in FIG. 25 are the same as the nodes in FIGS. 18 to 20.

In FIG. 25, the IP-PBX 2600 and the L-PGW 606 are configured as different nodes. However, the IP-PBX 2600 and the L-PGW 606 may be present as a single node. Further, a plurality of L-SGW 604 or a plurality of HeNB 602 may be logically or physically connected to the IP-PBX 2600 and the L-PGW 606.

Figure 26:
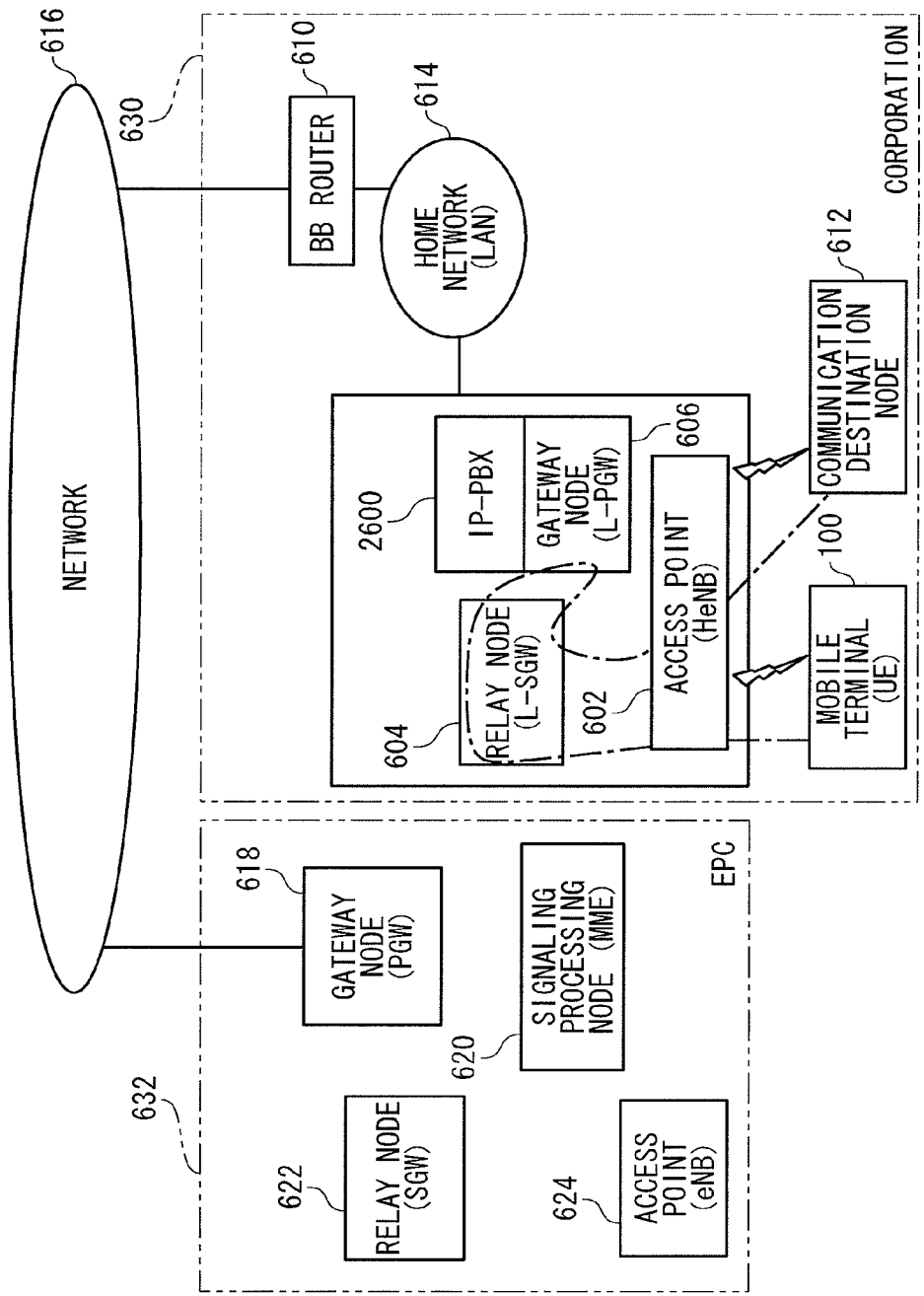
FIG. 26 is a diagram illustrating an example of a communication path when the UE 100 connected to the HeNB 602 in a corporation 630 performs communication such as VoIP call with a communication destination node 612 present in the same corporation 630.

FIG. 26 is a diagram illustrating an example of a communication path when the UE 100 connected to the HeNB 602 in the corporation 630 perform is bi-directional communication such as VoIP (Voice over IP) with the communication destination node 612 present in the same corporation 630. In FIG. 26, the communication path between the UE 100 and the communication destination node 612 is indicated by a one-dot chain line. In the example shown in FIG. 26, the UE 100 and the communication destination node 612 are connected to the same HeNB 602. However, the UE 100 and the communication destination node 612 may be connected to different HeNBs in the same corporation 630 and a communication path passing through different or identical L-SGW/L-PGW may be formed. However, when the communication path passing through different L-PGWs is formed, the different L-PGWs and the L-PGW 606 are assumed to be connected to the same IP-PBX 2600.

Figure 27:
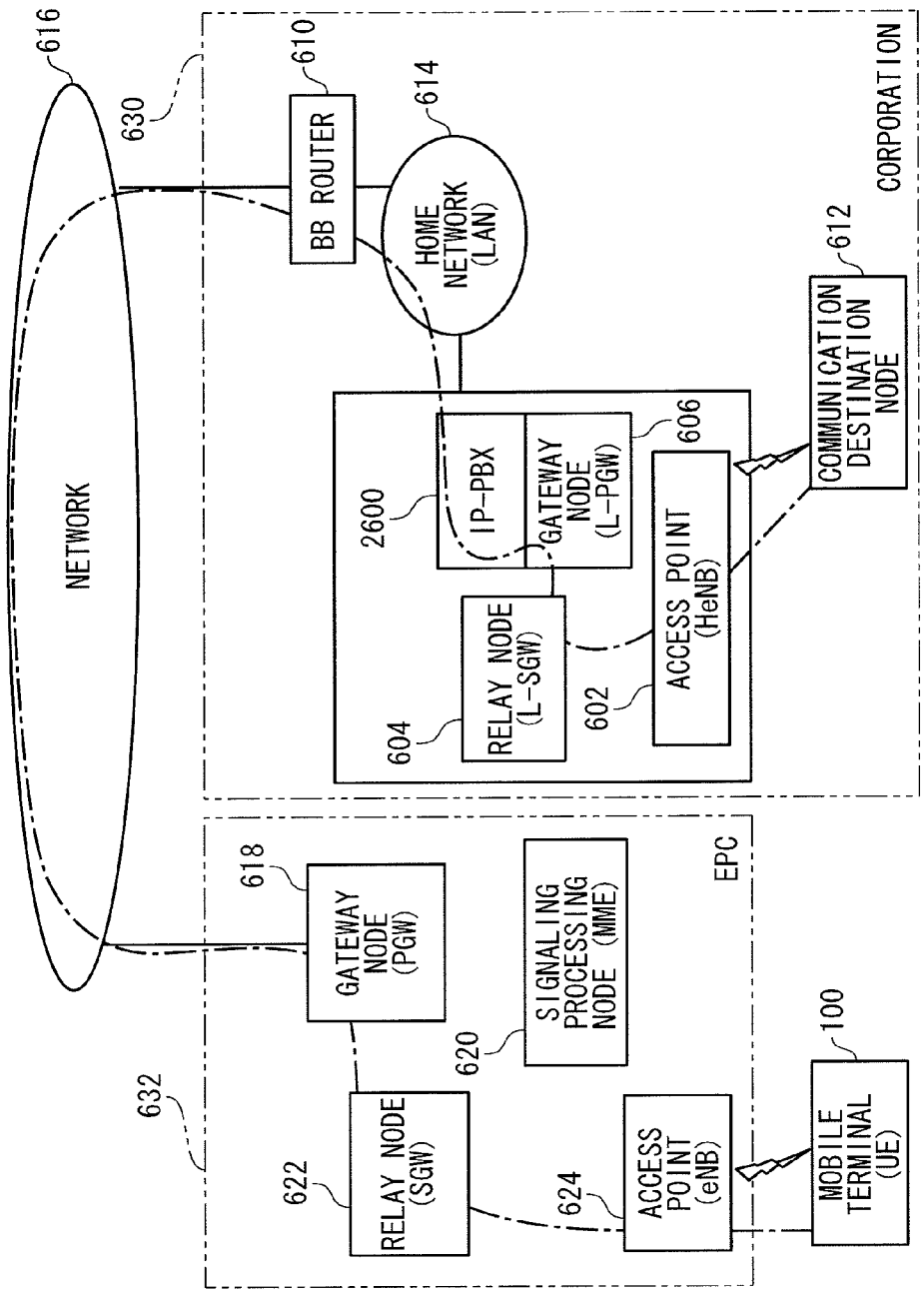
FIG. 27 is a diagram illustrating an example of a communication path when the UE 100 performs communication such as VoIP call with the communication destination node 612 of the corporation 630 from the outside of an LAN of the corporation 630.

FIG. 27 is a diagram illustrating an example of a communication path when the UE 100 performs communication such as VoIP calling from the outside of the LAN of the corporation 630 to the communication destination node 612 of the corporation 630. In FIG. 27, a communication path between the UE 100 and the communication destination node 612 is also indicated by a one-dot chain line.

Figure 28:
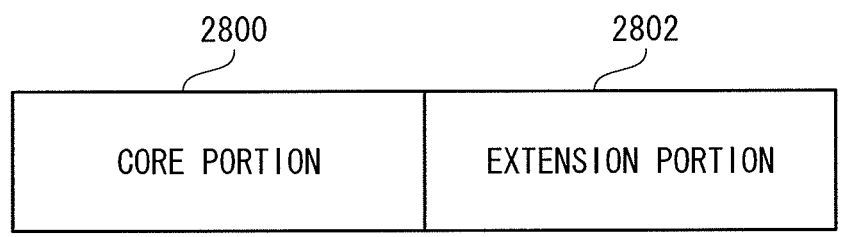

FIG. 28 is a diagram illustrating an example of the structure of sound (or an image or a moving image) data generated by a codec used in the VoIP or the like. As shown in FIG. 28, the sound (or an image or a moving image) data has a scalable structure that includes a core portion 2800 and at least one extension portion 2802 depending on a kind of codec (ITU-T G. 718 or the like). In the data having this structure, only the core portion 2800 can be decoded. However, when the core portion 2800 is decoded in addition to the extension portion 2802, the data with a better quality can be obtained. Therefore, whether only the core portion 2800 is transmitted or the extension portion 2802 is also transmitted is determined on a terminal or network side depending on a communication quality. In other words, since the transmission priority of the core portion 2800 is different from that of the extension portion 2802, different bearers having different QoS requests for the core portion 2800 and the extension portion 2802 are assumed. In this embodiment, it is assumed that the core portion 2800 and the extension portion 2802 are all transmitted in the communication of the in-house network of the same corporation and whether only the core portion 2800 or the extension portion 2802 is also transmitted is selected in communication in which at least one UE is present out of the corporation.

Figure 29:
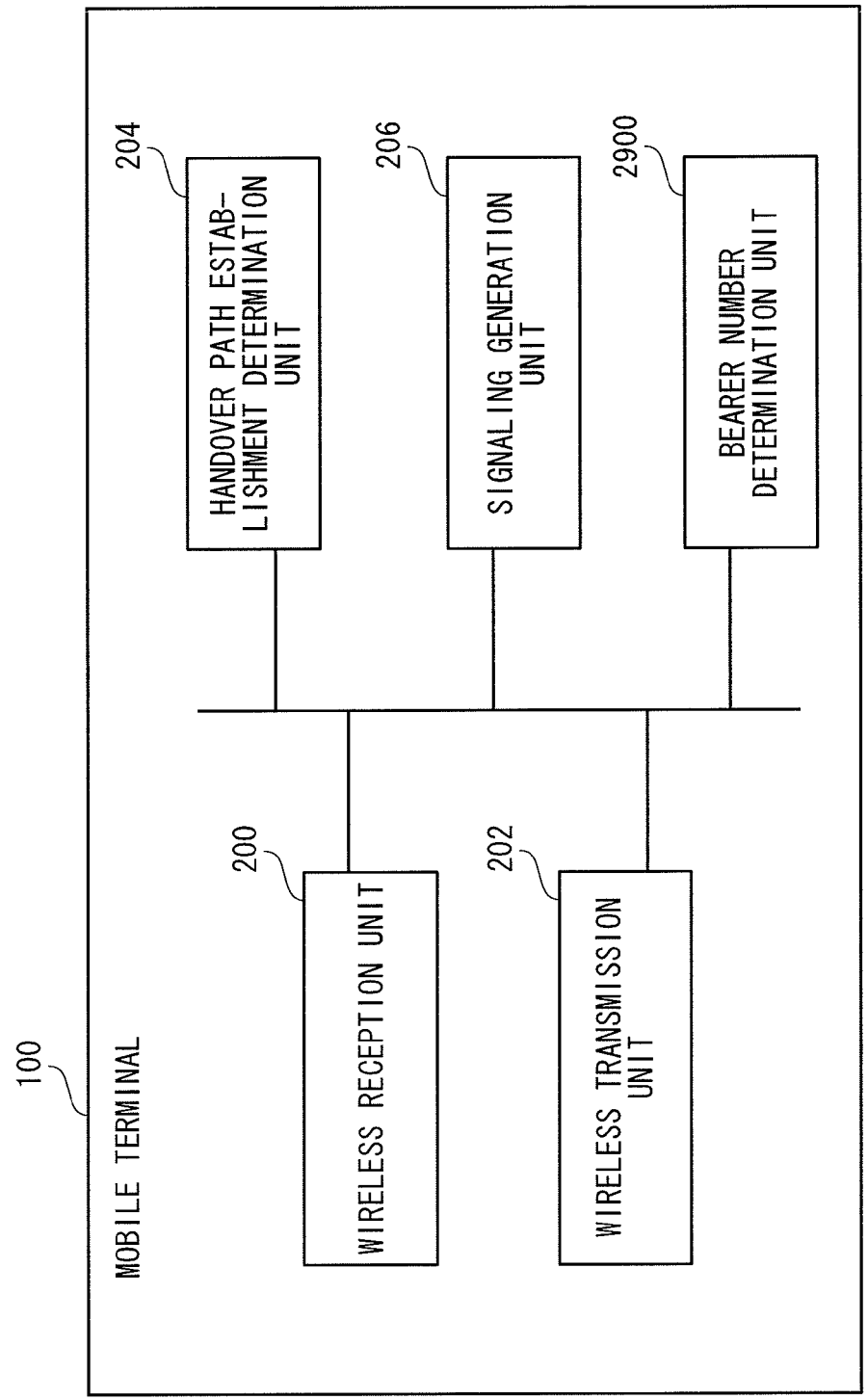
FIG. 29 is a block diagram illustrating an example of the configuration of a mobile terminal 100 according to a sixth embodiment.

FIG. 29 is a block diagram illustrating an example of the configuration of the mobile terminal 100 according to the sixth embodiment. As shown in FIG. 29, the mobile terminal 100 includes a wireless reception unit 200, a wireless transmission unit 202, a handover path establishment determination unit 204, a signaling generation unit 206, and a bearer number determination unit 2900.

The wireless reception unit 200, the wireless transmission unit 202, the handover path establishment determination unit 204, and the signaling generation unit 206 are the same as the constituent elements of the mobile terminal 100 described in the first embodiment with reference to FIG. 2. That is, the wireless reception unit 200 receives a radio signaling. The wireless transmission unit 202 transmits a radio signaling. When the mobile terminal 100 switches the connection to an access point (for example, the access point 110) in the neighborhood of the mobile terminal 100, the handover path establishment determination unit 204 detects that a gateway node (for example, the gateway node 104) through which the currently used communication path passes is not available, and establishes a handover communication path passing through the gateway node (for example, the gateway node 112) also available in a connection switching destination.

The bearer number determination unit 2900 determines the number of bearers used after the handover of the mobile terminal 100.

Hereinafter, an example of an operation of the handover path establishment determination unit 204 of the mobile terminal 100 will be described based on the configuration of the network shown in FIG. 25 with reference to FIGS. 30 and 31. Currently, the UE 100 is wirelessly connected to the HeNB 602 and is performing bi-directional data communication such as the VoIP with the communication destination node 612 via the L-SGW 604 and the L-PGW 606. The data communication may be performed via the IP-PBX 2600 (step s3002). At this time a radio bearer (RB) 3104 is established between the UE 100 and the HeNB 602, S1 bearers 3100 and 3102 are established between the HeNB 602 and the L-SGW 604, and an S5/S8 bearer is established between the L-SGW 604 and the L-PGW 606 (step s3000). Binding information is retained in the HeNB 602 and the L-SGW 604. Further, the RB 3104 and the RB 3106 are bound to the S1 bearer 3100 and the S1 bearer 3102, respectively. The former is the bearer along which the core portion 2800 of the data is transmitted and the latter is the bearer along which the extension portion 2802 of the data is transmitted.

When the mobile terminal 100 is connected to the HeNB 602, the handover path establishment determination unit 204 recognizes that the above-described bearer is bound from a CSG ID (Closed Subscriber Group IDentifier) or a connection destination APN (Access Point Name) disclosed in NPL 1 to the L-PGW 606 and the communication path is thus established. Then, before the connection is switched from the HeNB 602 to the eNB 624, the handover path establishment determination unit 204 determines a communication path between the communication destination node 612 of a subordinate of the eNB 624 and the PGW 618 enabling the data communication, that is, determines the establishment of a remote access communication path. Here, "binding the bearer" means that all of the data output from one bearer are set so as to be transmitted to the other bearer.

The bearer number determination unit 2900 determines whether the number of handover communication paths is set to be the same as that of the current communication or is reduced. In this example, it is assumed that the bearer number determination unit 2900 determines the number of handover communication paths, when only the core portion 2800 is transmitted using only one bearer after the handover from the state in which the core portion 2800 and the extension portion 2802 of the data are transmitted using two bearers in the corporation 630. Further, for example, the number of bearers after the handover may be determined based on the CSG ID of the connection destination HeNB even when the number of bearers is the number of bearers dependent on the charging plan of the user.

The signaling generation unit 206 generates a signaling used to establish the handover communication path. The signaling includes not only a normal parameter used to establish a communication path passing through a gateway node (for example, the gateway node 112) usable even in the connection switching destination but also a parameter used to instruct data transmitted along the currently used communication path to the currently connected access point (for example, the access point 102) to be treated as data transmitted along the communication path established by this signaling and a parameter indicating the number of established communication paths.

Hereinafter, an example of an operation of the signaling generation unit 206 of the UE 100 will be described based on the configuration of the network shown in FIG. 25 with reference to FIGS. 30 and 31. When a handover communication path is established with the PGW 618, the UE 100 connected to the HeNB 602 generates a PDN connectivity request, as described in NPL 1. The PDN connectivity request includes a flag (D-flag) indicating that the bearer established by this request is the bearer for the handover and the ID (RB ID) of the RB 820 currently used for a local access and the ID (RB ID) of the RB 3104 currently used for transmitting the core portion 2800 of the data in the corporation 630 in addition to the normal parameter (step s3004). Further, the currently used RB depends on the determination result of the bearer number determination unit 2900. Therefore, when the bearer number determination unit 2900 determines that all the number of currently used bearers is used even after the handover, the PDN connectivity request includes the IDs of all the currently used RBs.

When the MME 620 receives the PDN connectivity request, as described in NPL 1, the MME 620 retrieves the connection destination PGW and the SGW serving as a relay node based on the connection destination APN included in the signaling and transmits the signaling to establish the S1 bearer and the S5/S8 bearer (step s3006). Further, when the MME 620 retrieves the PGW and the SGW, the D-flag may be considered. When the MME 620 transmits a bearer setup request to the HeNB 602, the signaling includes the D-flag and the ID of the RB 3104 in the PDN connectivity request transmitted in step s3004 (step s3008). Therefore, the handover communication path (bearer) is established between the UE 100 and the PGW 618.

Figure 32:
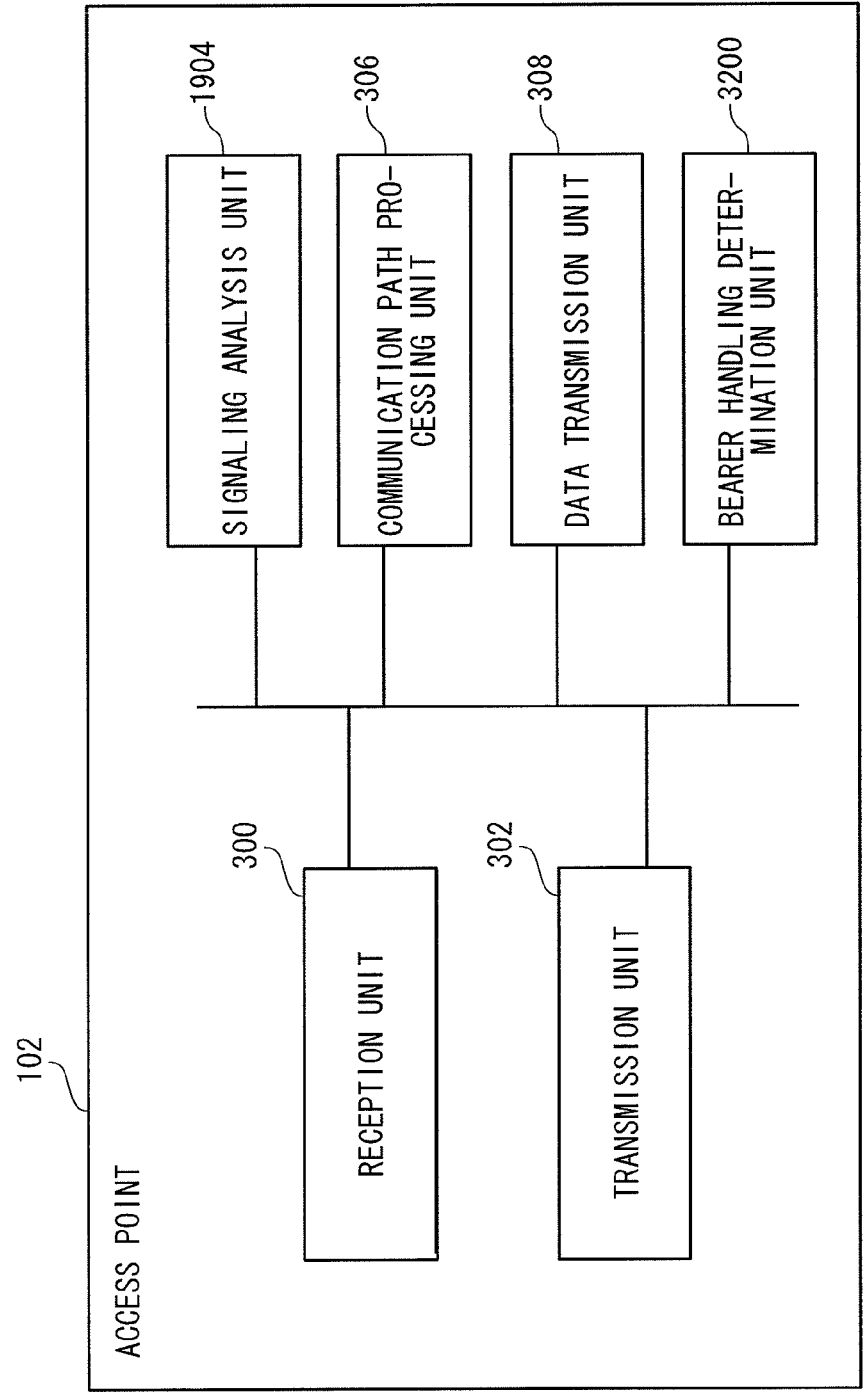
FIG. 32 is a block diagram illustrating an example of the configuration of an access point (HeNB) 102 according to the sixth embodiment.

FIG. 32 is a block diagram illustrating an example of the configuration of the access point (HeNB) 102 according to the sixth embodiment. As shown in FIG. 32, the access point 102 according to the sixth embodiment includes a reception unit 300, a transmission unit 302, a signaling analysis unit 1904, a communication path processing unit 306, a data transmission unit 308, and a bearer handing determination unit 3200. The reception unit 300, the transmission unit 302, the communication path processing unit 306, and the data transmission unit 308 are same as the constituent elements of the access point 102 described in the first embodiment with reference to FIG. 5. That is, the reception unit 300 receives a signaling. The transmission unit 302 transmits a signaling.

The signaling analysis unit 1904 analyzes the received signaling to confirm whether the received signaling includes a parameter used to establish a communication path for handover (for corporation), that is, a parameter used to give an instruction to treat the data transmitted via the communication path for the local access currently used by the UE 100 as data transmitted via the communication path for the remote access (for the outside of the corporation) established by the signaling.

The bearer handing determination unit 3200 determines a method of matching the S1 bearer to the RB. That is, the bearer handing determination unit 3200 determines whether the currently used S1 bearer is bound to the RB of the handover path or the S1 bearer for the handover is bound to the currently used RB, as in the first embodiment. In the example described below, it is assumed that the bearer handing determination unit 3200 determines that the S1 bearer for the handover is bound to the currently used RB. Further, the method of matching the S1 bearer to the RB may be, for example, a matching method determined in advance by software or may be determined in accordance with the number of UEs connected to the current access point (HeNB) 102.

Hereinafter, an example of each operation of the signaling analysis unit 1904, the bearer handing unit 3200, the communication path processing unit 306 of the HeNB 602 will be described based on the configuration of the network shown in FIG. 25 with reference to FIGS. 30 and 31. The signaling analysis unit 1904 analyzes the bearer setup request transmitted from the MME 620, as described in NPL 1, to confirm whether the bearer setup request includes the above-described D-flag and the ID of the RB currently used by the UE 100 (step s3010). When the bearer setup request includes this parameter, the communication path processing unit 306 treats the data transmitted along the S1 bearer 3100 currently used by the UE 100 as the data transmitted along the S1 bearer 3108 established by the signaling. Based on the determination of the bearer handling determination unit 3200, the communication path processing unit 306 binds the S1 bearer 3108 newly established in response to the bearer setup request to the currently used RB 3104 (step s3014).

Figure 31B:
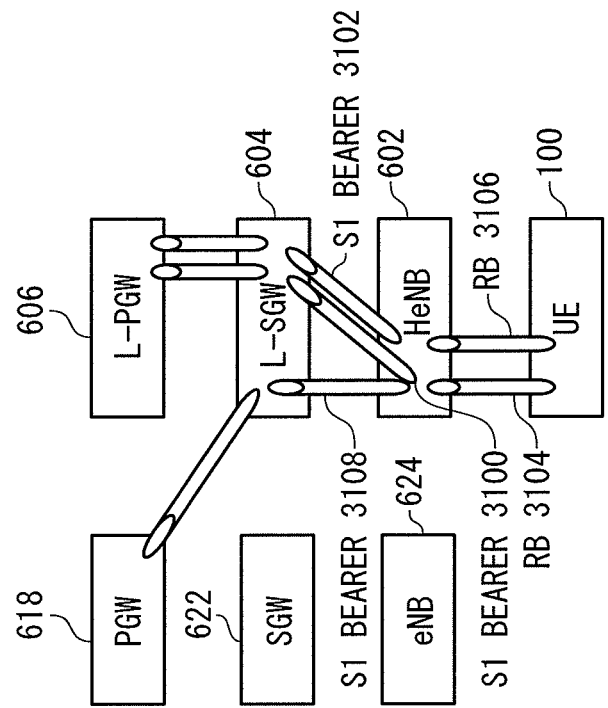
FIG. 31A is a diagram illustrating an example of binding of a bearer when only an S1 bearer 3100 is bound to an RB 3104 according to the sixth embodiment and FIG. 31B is a diagram illustrating an example of the binding of the bearer when an S1 bearer 3108 is bounded to an RB 3104 according to the sixth embodiment.
Figure 31A:
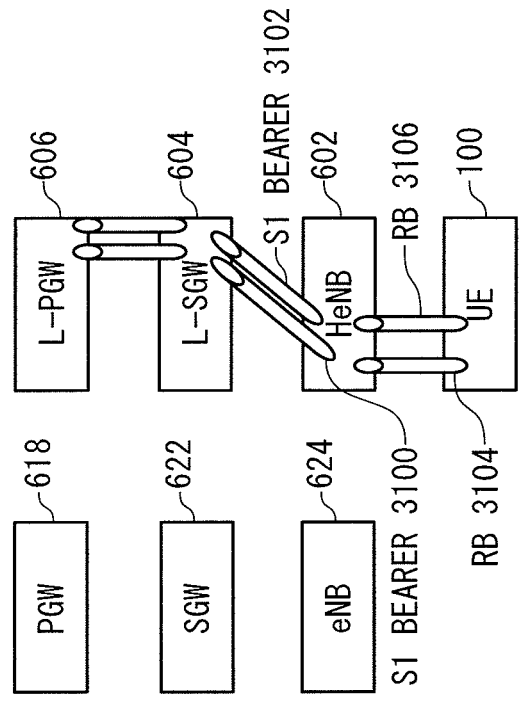

At this time, the HeNB 602 treats the RB 3104 as the currently used corporation bearer and an RB prepared for a dummy bearer for the handover. That is, the HeNB 602 considers the data transmitted from the communication destination node 612 to the mobile terminal 100 along the S1 bearer 3100 as data virtually transmitted along the S1 bearer 3108. However, data transmitted from the mobile terminal 100 to the communication destination node 612 along the RB 3104 is transmitted normally along the S1 bearer 3100. FIG. 31A is a diagram illustrating a state in which only the S1 bearer 3100 is bound to the RB 3104. FIG. 31B is a diagram illustrating a state in which the S1 bearer 3108 is bound to the RB 3104. Thus, wireless resources can be efficiently used by binding the dummy S1 bearer (3108) to the RB (3104) currently used in the corporation (house).

When the UE 100 switches the connection destination to the access point 110 (eNB 624), the data transmission unit 308 transmits the data, which has been transmitted from the communication destination node 106 (the communication destination node 612) to the access point 102 (HeNB 602) via the gateway node 104 (the L-PGW 606), to a data transmission tunnel established between the access points 102 and 110, as described in NPL 1. Further, a transmission starting timing and a transmission ending timing may be instructed from another node.

Hereinafter, an example of an operation of the data transmission unit 308 of the HeNB 602 will be described based on the configuration of the network shown in FIG. 25 with reference to FIGS. 30 and 31. In the handover process disclosed in NPL 1, the data transmission tunnel is established between the HeNB 602 and the eNB 624. The data transmission unit 308 starts transmitting the data, which has been transmitted from the communication destination node 612 to the UE 100 via the communication path (the S1 bearer 3100) for the local access, from the HeNB 602 to the eNB 624 in accordance with the method disclosed in NPL 1 (step s3018). When the UE 100 completes the handover to the eNB 624 and completely establishes the session with the IP-PBX 2600 in accordance with a method such as the above-described SIP (step s3020), the IP-PBX 2600 transmits a data transmission ending instruction to the HeNB 602 (step s3022). The data transmission unit 308 ends the data transmission in response to the data transmission ending instruction (step s3024).

According to the embodiment of the invention, as described above, when the mobile terminal performs handover between the networks in which handover anchor points are different from each other, the data is not transmitted along a redundant path. Accordingly, it is possible to shorten the interruption time of data reception involved in handover of a mobile terminal. Further, the handover of only the core portion 2800 of the data can be performed.

Seventh Embodiment

Figure 33:
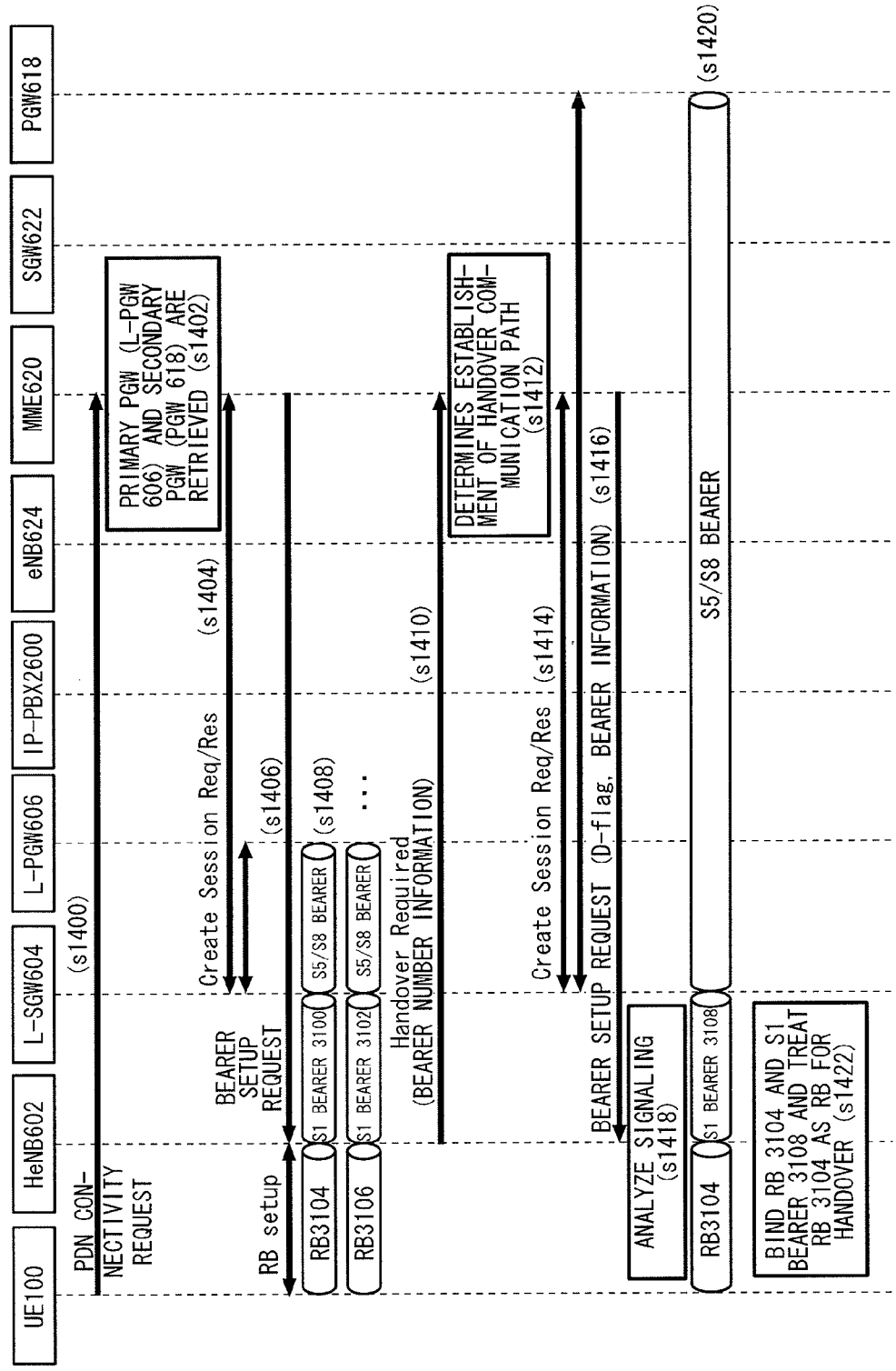
FIG. 33 is a sequence chart illustrating an example of a process signaling sequence according to a seventh embodiment.
Figure 34:
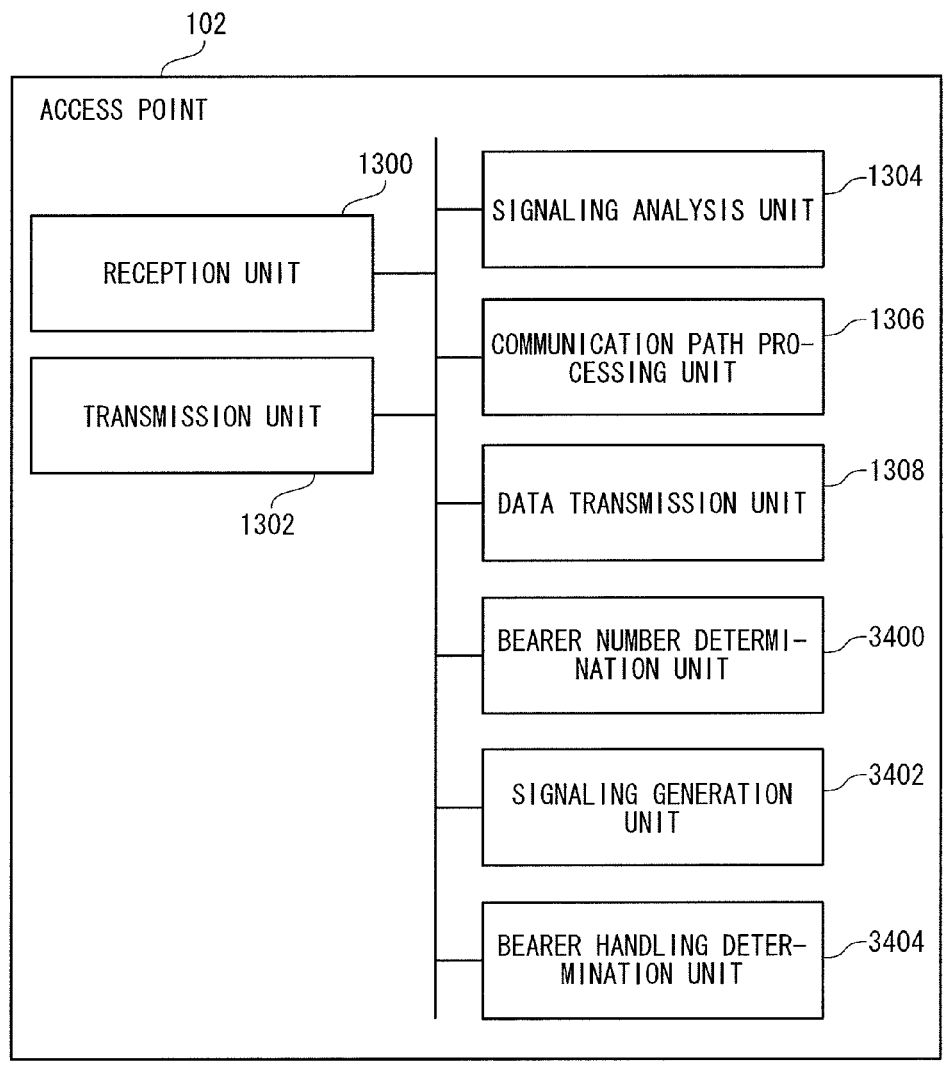
FIG. 34 is a block diagram illustrating an example of the configuration of an access point according to the seventh embodiment.

A seventh embodiment will be described with reference to FIGS. 1, 33, and 34. In this embodiment, a case in which the bearer establishment method described in the third embodiment is applied to the use case described in the sixth embodiment will be described. FIG. 33 is a sequence chart illustrating an example of a process signaling sequence according to the seventh embodiment. FIG. 34 is a block diagram illustrating an example of the configuration of an access point according to the seventh embodiment.

As shown in FIG. 33, a house (corporation) bearer is established in step s1400 to step s1406. The steps are the same as those of the third embodiment shown in FIG. 10. In this embodiment, a bearer is established for each of the core portion 2800 and the extension portion 2802. Further, a signaling such as a PDN connectivity request or "Create Session Request" may be transmitted twice in order to establish the two bearers. Alternatively, the two bearers may be established by one signaling. In the latter case, one signaling (each of the PDN connectivity request, a Create Session Req/Res, a bearer setup request, and an RB setup) includes parameters for the two bearers.

FIG. 34 is the block diagram illustrating an example of the configuration of an access point 102 according to the seventh embodiment. The access point 102 in FIG. 34 includes a reception unit 1300, a transmission unit 1302, a signaling analysis unit 1304, a communication path processing unit 1306, a data transmission unit 1308, a bearer number determination unit 3400, a signaling generation unit 3402, and a bearer handling determination unit 3404. Further, the reception unit 1300, the transmission unit 1302, the signaling analysis unit 1304, the communication path processing unit 1306, and the data transmission unit 1308 are the same as the constituent elements of the access point described in the third embodiment with reference to FIG. 11.

The bearer number determination unit 3400 determines the number of bearers to be used after the handover of the UE. For example, the access point 102 may search for the state of radio signals of a neighboring base station (the access point 624 or the like) and the number of bearers after the handover may be determined so as to be suitable for the state of the radio signals. For example, when the state of the radio signals in the neighborhood is good, two bearers may be determined. When the state of the radio signals is weak, one bearer is determined. For example, the number of bearers may be determined in advance by software, may be determined depending on a charging plan of a user, or may be determined based on the CSG ID of the connection destination HeNB. The signaling generation unit 3402 adds information (bearer number information) indicating the number of bearers determined by the bearer number determination number 3400 to "Handover Required" and transmits "Handover Required" to the MME 620 (step s1410). Further, for example, the signaling generation unit 3402 may add the IDs of all the corresponding RBs or may add the number of bearers as a numerical value or a flag.

The bearer handling determination unit 3404 determines a method of matching the S1 bearer to the RB. That is, the bearer handling determination unit 3404 determines whether the currently used S1 bearer is bound to the RB of the handover path or the S1 bearer for the handover is bound to the currently used RB, as in the first embodiment. In the example described below, it is assumed that the bearer handing determination unit 3404 determines that the S1 bearer for the handover is bound to the currently used RB. Further, the method of matching the S1 bearer to the RB may be a matching method determined in advance by software or may be determined in accordance with the number of UEs connected to the current access point (HeNB) 102.

The MME 620 performs a process of establishing a bearer for the handover based on the bearer number information added to "Handover Required" (step s1412 to step s1416). In this embodiment, however, only the bearer corresponding to the core portion 2800 is established for the handover. The operation other than step s1412 to step s1416 is the same as the operation of the third embodiment.

The signaling analysis unit 1304 of the access point 102 (the HeNB 602) analyzes the bearer setup request transmitted from the MME 620 to confirm the bearer setup request includes the above-described D-flag and the above-described ID of the S1 bearer 3100 currently used by the UE 100 (step s1418). The bearer setup request may include the bearer number information.

Based on the analysis result of the signaling analysis unit 1304 and the determination of the bearer handling determination unit 3404, the communication path processing unit 1306 binds the S1 bearer 3108 newly established as the S1 bearer for the handover to the RB 3104 currently used for the core portion 2800 and treats the RB 3104 as the RB for the handover. That is, the access point 102 (the HeNB 602) considers the data transmitted from the communication destination node to the UE 100 along the S1 bearer 3100 as the data virtually transmitted along the S1 bearer 3108 and transmits, to the S1 bearer 3100, the data to be transmitted from the UE 100 to the communication destination node along the RB 3104.

According to the embodiment of the invention, as described above, when the mobile terminal performs handover between the networks in which handover anchor points are different from each other, the data is not transmitted along a redundant path. Accordingly, it is possible to shorten the interruption time of data reception involved in handover of a mobile terminal. Further, the advantage can be realized without a change in the configuration of the mobile terminal.

The embodiments of the invention have hitherto been described.

In the embodiments, the cases in which the invention is realized by hardware have been described. However, the invention may be realized by software.

Each functional block used to describe the embodiment and each modification is typically implemented by an LSI, which is an integrated circuit. Each functional block may be integrated into one chip, or a portion of or the entire functional block may be integrated into one chip. Here, the LSI is used as the integrated circuit, but the integrated circuit may be called an IC, a system LSI, a super LSI, or an ultra LSI according to the degree of integration.

In addition, a circuit integration method is not limited to LSI, but circuit integration may be implemented by a dedicated circuit or a general-purpose processor. After the LSI circuit is manufactured, a programmable FPGA (Field Programmable Gate Array) or a reconfigurable processor capable of reconfiguring the connection of circuit cells in the LSI circuit or the setting thereof may be used.

When a circuit integration technique capable of replacing LSI appears with the progress of semiconductor technology or other technologies derived from the semiconductor technology, the technique may be used to integrate the functional blocks. For example, biotechnology can be applied.

Although the present invention has been described in detail and with reference to specific embodiments, diverse modifications or corrections may be made by those of skilled in the art without departing from the spirit and scope of the present invention.

This application is based on Japanese Patent Application (Japanese Patent Application No. 2010-072359) filed on Mar. 26, 2010 and Japanese Patent Application (Japanese Patent Application No. 2011-002189) filed on Jan. 7, 2011, the disclosure of which is incorporated herein by reference in its entirety.

INDUSTRIAL APPLICABILITY

The mobile wireless system according to the invention is useful as a system or the like capable of shortening the interruption time of the data reception involved in the handover of the mobile terminal, when the mobile terminal performs the handover between the networks in which handover anchor points are different from each other.

REFERENCE SIGNS LIST

100: mobile terminal (UE)
102, 110, 402, 412, 602, 624: access point (eNB, HeNB)
104, 112, 416, 606, 618: gateway node (PGW, L-PGW)
106, 408, 612: communication destination node
108, 410, 620: signaling processing node (MME)
114, 406, 616: network
120, 420, 632: access network (EPC)
200, 2000: wireless reception unit
202, 2002: wireless transmission unit
204, 2004: handover path establishment determination unit
206, 906, 1208, 1508, 2006, 3402: signaling generation unit
300, 900, 1000, 1200, 1300, 1500, 1600: reception unit
302, 902, 1002, 1202, 1302, 1502, 1602: transmission unit
304, 1004, 1304, 1604, 1904: signaling analysis unit
306, 1006, 1306, 1606: communication path processing unit
308, 1008, 1308: data transmission unit
404, 414, 604, 622: relay node (SGW, L-SGW)
608: home gateway (HGW)
610: broadband router (BB router)
614: home network
630: house or corporation
820, 824, 1702, 1708: RB
822, 826, 1700, 1704, 1706: S1 bearer
904, 1204, 1504: gateway node analysis unit
1206: handover communication path establishment determination unit
1506: local access communication path establishment determination unit
2600: IP-PBX
2800: core portion
2802: extension portion
3104, 3106: RB
3100, 3102, 3108: S1 bearer 2900, 3400: bearer number determination unit
3200, 3404: bearer handling determination unit

The invention claimed is:

1. A mobile wireless system in which a mobile terminal performs handover between networks in which handover anchor points are different from each other, comprising:
- first and second gateway nodes which are the different handover anchor points;
- a first access point device which is able to establish a first communication path and a second communication path with both the first and second gateway nodes simultaneously; and
- a second access point device which is able to establish a third communication path only with the second gateway node,
- wherein when the mobile terminal connected to the first access point device and being communicating with a communication destination node using the first communication path passing through the first gateway node switches a connection destination from the first access point device to the second access point device,
- the first access point device establishes a data transmission path between the first access point device and the second access point device, while maintaining the communication along the first communication path, before the first access point device disconnects the connection from the mobile terminal, and
- the first access point device transmits data, which has been transmitted from the communication destination node to the first access point device along the first communication path, to the second access point device along the data transmission path, until the connection between the mobile terminal and the first access point device is disconnected, the mobile terminal is connected to the second access point device, and the third communication path passing through the second gateway node and reaching the communication destination node is established.

2. The mobile wireless system according to claim 1, further comprising:
- in a network including the second access point device and the second gateway node,
- a signaling processing node configured to transmit information regarding the second gateway node to the first access point device based on information transmitted from the mobile terminal involved in the handover.

3. The mobile wireless system according to claim 2,
- wherein the signaling processing node transmits the information regarding the second gateway node to the first access point device, after the mobile terminal determines the connection destination from the first access point device to the second access point device.

4. The mobile wireless system according to claim 2,
- wherein when the mobile terminal connected to the second access point device and being communicating with the communication destination node using the third communication path passing through the second gateway node switches the connection destination from the second access point device to the first access point device,
- the first access point device establishes the second communication path passing the first access point device and the second gateway node, while maintaining the communication along the third communication path, before the second access point device disconnects the connection from the mobile terminal, and
- the first access point device receives data transmitted from the communication destination node along the second communication path, until the connection between the mobile terminal and the second access point device is disconnected, the mobile terminal is connected to the first access point device, and the first communication path passing through the first gateway node and reaching the communication destination node is established.

5. The mobile wireless system according to claim 1,
- wherein the mobile terminal receives the data along the second communication path passing through the second gateway node and the first access point device from the communication destination node, while the mobile terminal switches the connection destination from the first access point device to the second access point device.

6. The mobile wireless system according to claim 1,
- wherein the first communication path is formed by a plurality of communication paths, while the mobile terminal and the communication destination node communicate with each other in the same network, and
- wherein the first access point device forms the second communication path so that the second communication path is formed by communication paths of the same number as at least one communication path selected from the plurality of communication paths forming the first communication path, when the mobile terminal performs the handover between the different networks.

7. The mobile wireless system according to claim 6,
- wherein data transmitted in the network or between the networks includes a core layer and at least one extension layer subordinate to the core layer,
- wherein while the mobile terminal and the communication destination node communicate with each other in the same network, the first communication path includes a core layer communication path along which the core layer is transmitted and an extension layer communication path along which the extension layer is transmitted, and
- wherein the first access point device transmits only data of the core layer along the second communication path, when the mobile terminal performs the handover to another network.

8. An access point device which is able to establish a first communication path and a second communication path simultaneously with both first and second gateway nodes serving as different handover anchor points when a mobile terminal performs handover between networks in which the handover anchor points are different from each other,
- wherein when the mobile terminal connected to the access point device and being communicating with a communication destination node using the first communication path passing through the first gateway node switches a connection destination from the access point device to another access point device which is able to establish a third communication path only with the second gateway node,
- the access point device establishes a data transmission path between the access point device and the another access point device, while maintaining the communication along the first communication path, before the access point device disconnects the connection from the mobile terminal, and
- the access point device transmits data, which has been transmitted from the communication destination node to the access point device along the first communication path, to another access point device along the data transmission path, until the connection between the mobile terminal and the access point device is disconnected, the mobile terminal is connected to another access point device, and the third communication path passing through the second gateway node and reaching the communication destination node is established.

9. A handover processing method in a mobile wireless system including first and second gateway nodes which are different handover anchor points, a first access point device that is able to establish a first communication path and a second communication path with both the first and second gateway nodes simultaneously, and a second access point device that is able to establish a third communication path only with the second gateway node,
- wherein when the mobile terminal connected to the first access point device and being communicating with a communication destination node using the first communication path passing through the first gateway node switches a connection destination from the first access point device to the second access point device,
- the first access point device establishes a data transmission path between the first access point device and the second access point device, while maintaining the communication along the first communication path, before the first access point device disconnects the connection from the mobile terminal, and
- the first access point device transmits data, which has been transmitted from the communication destination node to the first access point device along the first communication path, to the second access point device along the data transmission path, until the connection between the mobile terminal and the first access point device is disconnected, the mobile terminal is connected to the second access point device, and the third communication path passing through the second gateway node and reaching the communication destination node is established.

10. The access point device according to claim 8,
- wherein the access point device receives information regarding the second gateway node from a signaling processing node which is located in a network including the second access point device and the second gateway node, the information corresponding to information transmitted from the mobile terminal involved in the handover.

11. The handover processing method according to claim 9,
- wherein a signaling processing node, which is located in a network including the second access point device and the second gateway node, transmits information regarding the second gateway node to the first access point device based on information transmitted from the mobile terminal involved in the handover.

* * * * *